US011935551B2

(12) United States Patent
Villemoes et al.

(10) Patent No.: US 11,935,551 B2
(45) **Date of Patent: *Mar. 19, 2024**

(54) CROSS PRODUCT ENHANCED HARMONIC TRANSPOSITION

(71) Applicant: DOLBY INTERNATIONAL AB, Dublin (IE)

(72) Inventors: Lars Villemoes, Jarfalla (SE); Per Hedelin, Gothenburg (SE)

(73) Assignee: DOLBY INTERNATIONAL AB, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 18/311,542

(22) Filed: May 3, 2023

(65) Prior Publication Data

US 2023/0298606 A1 Sep. 21, 2023

Related U.S. Application Data

(63) Continuation of application No. 17/338,431, filed on Jun. 3, 2021, now Pat. No. 11,682,410, which is a (Continued)

(51) Int. Cl.
*G10L 19/26* (2013.01)
*G10L 19/02* (2013.01)
(Continued)

(52) U.S. Cl.
CPC ............ *G10L 19/265* (2013.01); *G10L 19/02* (2013.01); *G10L 21/0388* (2013.01); *G10L 25/90* (2013.01)

(58) Field of Classification Search
CPC ... G10L 19/265; G10L 19/02; G10L 21/0388; G10L 25/90
See application file for complete search history.

(56) References Cited

U.S. PATENT DOCUMENTS

| | | | |
|---|---|---|---|
| 4,048,443 | A | 9/1977 | Crochiere |
| 5,856,674 | A | 1/1999 | Kellerman |

(Continued)

FOREIGN PATENT DOCUMENTS

| | | |
|---|---|---|
| CN | 1272259 | 11/2000 |
| CN | 1893412 | 1/2007 |

(Continued)

OTHER PUBLICATIONS

Avendano, C. et al."Beyond NYQUIST: Towards the Recovery of Broad-Bandwidth Speech from Narrow-Bandwidth Speech", Proceedings of the 4th European Conference on Speech Communication and Technology (EUROSPEECH) Sep. 1995, pp. 165-168.

(Continued)

*Primary Examiner* — Douglas Godbold
*Assistant Examiner* — Edward Tracy, Jr.

(57) ABSTRACT

The present invention relates to audio coding systems which make use of a harmonic transposition method for high frequency reconstruction (HFR). A system and a method for generating a high frequency component of a signal from a low frequency component of the signal is described. The system comprises an analysis filter bank providing a plurality of analysis subband signals of the low frequency component of the signal. It also comprises a non-linear processing unit to generate a synthesis subband signal with a synthesis frequency by modifying the phase of a first and a second of the plurality of analysis subband signals and by combining the phase-modified analysis subband signals. Finally, it comprises a synthesis filter bank for generating the high frequency component of the signal from the synthesis subband signal.

12 Claims, 17 Drawing Sheets

Related U.S. Application Data continuation of application No. 16/810,756, filed on Mar. 5, 2020, now Pat. No. 11,031,025, which is a continuation of application No. 16/212,958, filed on Dec. 7, 2018, now Pat. No. 10,586,550, which is a continuation of application No. 15/710,021, filed on Sep. 20, 2017, now Pat. No. 10,192,565, which is a continuation of application No. 14/306,529, filed on Jun. 17, 2014, now Pat. No. 9,799,346, which is a continuation of application No. 13/144,346, filed as application No. PCT/EP2010/050483 on Jan. 15, 2010, now Pat. No. 8,818,541.

(60) Provisional application No. 61/145,223, filed on Jan. 16, 2009.

(51) Int. Cl.

*G10L 21/0388* (2013.01)
*G10L 25/90* (2013.01)

(56) References Cited

U.S. PATENT DOCUMENTS

| | | | |
|---|---|---|---|
| 6,680,972 | B1 | 1/2004 | Liljeryd et al. |
| 6,708,145 | B1 | 3/2004 | Liljeryd et al. |
| 6,978,236 | B1 | 12/2005 | Liljeryd |
| 7,003,451 | B2 | 2/2006 | Kristofer |
| 7,003,467 | B1 | 2/2006 | Smith |
| 7,013,269 | B1 | 3/2006 | Bhaskar |
| 7,050,972 | B2 | 5/2006 | Henn |
| 7,260,520 | B2 | 8/2007 | Henn |
| 7,483,758 | B2 | 1/2009 | Liljeryd |
| 9,799,346 | B2 | 10/2017 | Villemoes |
| 10,192,565 | B2 | 1/2019 | Villemoes |
| 10,586,550 | B2 | 3/2020 | Villemoes |
| 2002/0049583 | A1 | 4/2002 | Bruhn |
| 2002/0087304 | A1 | 7/2002 | Kjorling et al. |
| 2002/0103637 | A1 | 8/2002 | Henn et al. |
| 2002/0118845 | A1 | 8/2002 | Henn et al. |
| 2003/0158726 | A1 | 8/2003 | Philippe |
| 2004/0028244 | A1 | 2/2004 | Tsushima |
| 2004/0107090 | A1 | 6/2004 | Oh |
| 2004/0131203 | A1 | 7/2004 | Liljeryd et al. |
| 2006/0031064 | A1 | 2/2006 | Liljerd |
| 2006/0256971 | A1 | 11/2006 | Chong |
| 2006/0293016 | A1 | 12/2006 | Giesbrecht |
| 2007/0088542 | A1 | 4/2007 | Vos |
| 2007/0129036 | A1 | 6/2007 | Arora |
| 2008/0109215 | A1 | 5/2008 | Liu |
| 2008/0126086 | A1 | 5/2008 | Kandhadai |
| 2008/0177539 | A1 | 7/2008 | Huang |
| 2008/0208575 | A1 | 8/2008 | Laaksonen et al. |
| 2008/0288261 | A1 | 11/2008 | Chuang |
| 2014/0297295 | A1 | 10/2014 | Villemoes et al. |

FOREIGN PATENT DOCUMENTS

| | | | |
|---|---|---|---|
| CN | 101089951 | 12/2007 | |
| CN | 101105940 | 1/2008 | |
| DE | 4447257 | 1/1996 | |
| DE | 102007029381 | 12/2007 | |
| EP | 745971 A2 * | 12/1996 | ............. G10L 19/09 |
| EP | 1158494 | 11/2001 | |
| EP | 1739658 | 1/2007 | |
| JP | 8129834 | 5/1996 | |
| JP | 2001-521648 | 11/2001 | |
| JP | 2003-216190 | 7/2003 | |
| JP | 2004-517368 | 6/2004 | |
| JP | 2005-520217 | 7/2005 | |
| JP | 3871347 | 10/2006 | |
| JP | 3926726 | 6/2007 | |
| KR | 2007-0000995 | 1/2007 | |
| KR | 10-2008-0027129 | 3/2008 | |
| RU | 2244386 | 1/2005 | |
| RU | 2251795 | 5/2005 | |
| RU | 2256293 | 7/2005 | |
| RU | 2007116941 | 11/2008 | |
| TW | 1303410 | 11/2008 | |
| TW | 200847134 | 12/2008 | |
| WO | 9812827 | 3/1998 | |
| WO | 98/57436 | 12/1998 | |
| WO | 0137263 | 5/2001 | |
| WO | 2002052545 | 7/2002 | |
| WO | 2002069326 | 9/2002 | |
| WO | 2002069328 | 9/2002 | |
| WO | 02/080362 | 10/2002 | |
| WO | 03/003345 | 1/2003 | |
| WO | 2003/007656 | 1/2003 | |
| WO | 2003/046891 | 6/2003 | |
| WO | 2004025625 | 3/2004 | |
| WO | 2004/097795 | 11/2004 | |
| WO | 2005/027095 | 3/2005 | |
| WO | 2005/036527 | 4/2005 | |
| WO | 2005/040749 | 5/2005 | |
| WO | 2006/130221 | 12/2006 | |

OTHER PUBLICATIONS

Bansal, et al., "Bandwidth Expansion of Narrowband Speech Using non-Negative Matrix Factorization" Mitsubishi Electric Research Laboratories, Cambridge, Massachusetts, USA. TR2005-135, Sep. 2005.

Budsabathon, et al., "Bandwidth Extension with Hybrid Signal Extrapolation for Audio Coding" IEICE Trans. Fundamentals, vol. E90-A, No. 8, Aug. 2007, pp. 1564-1569.

Bulu, et al., "Spectral Extrapolation of Narrowband Speech" 2007 15th IEEE Signal Processing and Communications Applications, on Jun. 11-13, 2007, Eskisehir, Turkey.

Chen, et al., "The Research and Implementation of SBR High Frequency Reconstruction Technology" 2006 Tsinghua Tongfang Knowledge Network Technology Co., Ltd., Beijing.

Dietz, et al., "Spectral Band Replicatiion, a Novel Approach in Audio Coding" AES Convention Paper presented at the 112th Convention May 10-13, 2002, Munich, Germany pp. 1-8.

Ferreira, et al., "Accurate Spectral Replacement" AES Convention Paper 6383, presented at the 118th Convention, May 28-31, 2005, Barcelona, Spain, pp. 1-11.

Hsu, et al., "Audio Patch Method in MPEG-4 HE-AAC Decoder" presented at the AES 117th Convention Oct. 28-31, 2004, San Francisco, CA, USA, pp. 2-11.

Hsu, et al., "Design for High Frequency Adjustment Module in MPEG-4 HEAAC Encoder Based on Linear Prediction Method" presented at the AES 120th Convention, May 20-23, 2006, Paris, France, pp. 1-10.

Liu, et al., "High Frequency Reconstruction by Linear Extrapolation" AES Convention Paper presented at the 115th Convention, Oct. 10-13, 2003, New York, New York, USA, pp. 1-8.

Sinha, et al., "A Fractal Self-Similarity Model for the Spectral Representation of Audio Signals" AES presented at the 118th Convention, May 28-31, 2005, Barcelona, Spain.

Su, et al., "A New Audio Compression Method Based on Spectral Oriented Trees" AES Convention Paper 6380, presented at the 118th Convention, May 28-31, 2005, Barcelona, Spain, pp. 1-7.

Taniguchi, et al., "A High-Efficiency Speech Coding Algorithm Based on ADPCM with Multi-Quantizer" ICASSP 86, Tokyo, 1986 IEEE, pp. 1721-1724.

Wolters, et al., "A Closer Look into MPEG-4 High Efficiency AAC", AES Convention Paper 5871, presented at the 115th Convention, Oct. 10-13, 2003, New York, NY, USA, pp. 1-16.

Zernicki, T. et al."Improved Coding of Tonal Components in MPEG-4 AAC with SBR" 16th European Signal Processing Conference (EUSIPCO 2008), Laussane, Switzerland, Aug. 25, 2008, pp. 1-5.

* cited by examiner

CROSS PRODUCT ENHANCED HARMONIC TRANSPOSITION

CROSS REFERENCE TO RELATED APPLICATIONS

The present application is a continuation of, and claims the benefit of priority to, U.S. patent application Ser. No. 17/338,431 filed Jun. 3, 2021, which is a continuation of U.S. patent application Ser. No. 16/810,756 filed Mar. 5, 2020, now U.S. Pat. No. 11,031,025 issued Jun. 8, 2021, which is a continuation of U.S. patent application Ser. No. 16/212,958 filed Dec. 7, 2018, now U.S. Pat. No. 10,586,550 issued Mar. 10, 2020, which is a continuation of U.S. patent application Ser. No. 15/710,021 filed Sep. 20, 2017, now U.S. Pat. No. 10,192,565 issued Jan. 29, 2019, which is a continuation of U.S. patent application Ser. No. 14/306,529 filed Jun. 17, 2014, now U.S. Pat. No. 9,799,346 issued Oct. 24, 2017, which is a continuation of U.S. patent application Ser. No. 13/144,346 filed Aug. 8, 2011, now U.S. Pat. No. 8,818,541 issued Aug. 26, 2014, which is a national phase application based on International Patent Application No. PCT/EP2010/050483 having an international filing date of Jan. 15, 2010, which claims priority to U.S. Provisional Patent Application No. 61/145,223 filed Jan. 16, 2009. The contents of all of the above applications are incorporated by reference in their entirety for all purposes.

TECHNICAL FIELD

The present invention relates to audio coding systems which make use of a harmonic transposition method for high frequency reconstruction (HFR).

BACKGROUND OF THE INVENTION

HFR technologies, such as the Spectral Band Replication (SBR) technology, allow to significantly improve the coding efficiency of traditional perceptual audio codecs. In combination with MPEG-4 Advanced Audio Coding (AAC) it forms a very efficient audio codec, which is already in use within the XM Satellite Radio system and Digital Radio Mondiale. The combination of AAC and SBR is called aacPlus. It is part of the MPEG-4 standard where it is referred to as the High Efficiency AAC Profile. In general, HFR technology can be combined with any perceptual audio codec in a back and forward compatible way, thus offering the possibility to upgrade already established broadcasting systems like the MPEG Layer-2 used in the Eureka DAB system. HFR transposition methods can also be combined with speech codecs to allow wide band speech at ultra low bit rates.

The basic idea behind HRF is the observation that usually a strong correlation between the characteristics of the high frequency range of a signal and the characteristics of the low frequency range of the same signal is present. Thus, a good approximation for the representation of the original input high frequency range of a signal can be achieved by a signal transposition from the low frequency range to the high frequency range.

This concept of transposition was established in WO 98/57436, as a method to recreate a high frequency band from a lower frequency band of an audio signal. A substantial saving in bit-rate can be obtained by using this concept in audio coding and/or speech coding. In the following, reference will be made to audio coding, but it should be noted that the described methods and systems are equally applicable to speech coding and in unified speech and audio coding (USAC).

In a HFR based audio coding system, a low bandwidth signal is presented to a core waveform coder and the higher frequencies are regenerated at the decoder side using transposition of the low bandwidth signal and additional side information, which is typically encoded at very low bit-rates and which describes the target spectral shape. For low bit-rates, where the bandwidth of the core coded signal is narrow, it becomes increasingly important to recreate a high band, i.e. the high frequency range of the audio signal, with perceptually pleasant characteristics. Two variants of harmonic frequency reconstruction methods are mentioned in the following, one is referred to as harmonic transposition and the other one is referred to as single sideband modulation.

The principle of harmonic transposition defined in WO 98/57436 is that a sinusoid with frequency $\omega$ is mapped to a sinusoid with frequency $T\omega$ where $T>1$ is an integer defining the order of the transposition. An attractive feature of the harmonic transposition is that it stretches a source frequency range into a target frequency range by a factor equal to the order of transposition, i.e. by a factor equal to T. The harmonic transposition performs well for complex musical material. Furthermore, harmonic transposition exhibits low cross over frequencies, i.e. a large high frequency range above the cross over frequency can be generated from a relatively small low frequency range below the cross over frequency.

In contrast to harmonic transposition, a single sideband modulation (SSB) based HFR maps a sinusoid with frequency $\omega$ to a sinusoid with frequency $\omega+\Delta\omega$ where $\Delta\omega$ is a fixed frequency shift. It has been observed that, given a core signal with low bandwidth, a dissonant ringing artifact may result from the SSB transposition. It should also be noted that for a low cross-over frequency, i.e. a small source frequency range, harmonic transposition will require a smaller number of patches in order to fill a desired target frequency range than SSB based transposition. By way of example, if the high frequency range of $(\omega, 4\omega]$ should be filled, then using an order of transposition $T=4$ harmonic transposition can fill this frequency range from a low frequency range of $(\frac{1}{4}\omega,\omega]$. On the other hand, a SSB based transposition using the same low frequency range must use a frequency shift of $\Delta\omega=\frac{3}{4}\omega$ and it is necessary to repeat the process four times in order to fill the high frequency range $(\omega,4\omega]$.

On the other hand, as already pointed out in WO 02/052545 A1, harmonic transposition has drawbacks for signals with a prominent periodic structure. Such signals are superimpositions of harmonically related sinusoids with frequencies $\Omega, 2\Omega, 3\Omega, \ldots$, where $\Omega$ is the fundamental frequency.

Upon harmonic transposition of order T, the output sinusoids have frequencies $T\Omega, 2T\Omega, 3T\Omega, \ldots$, which, in case of $T>1$, is only a strict subset of the desired full harmonic series. In terms of resulting audio quality a "ghost" pitch corresponding to the transposed fundamental frequency $T\Omega$ will typically be perceived. Often the harmonic transposition results in a "metallic" sound character of the encoded and decoded audio signal. The situation may be alleviated to a certain degree by adding several orders of transposition $T=2, 3, \ldots, T_{max}$ to the HFR, but this method is computationally complex if most spectral gaps are to be avoided.

An alternative solution for avoiding the appearance of "ghost" pitches when using harmonic transposition has been presented in WO 02/052545 A1. The solution consists in using two types of transposition, i.e. a typical harmonic transposition and a special "pulse transposition". The described method teaches to switch to the dedicated "pulse transposition" for parts of the audio signal that are detected to be periodic with pulse-train like character. The problem with this approach is that the application of "pulse transposition" on complex music material often degrades the quality compared to harmonic transposition based on a high resolution filter bank. Hence, the detection mechanisms have to be tuned rather conservatively such that pulse transposition is not used for complex material. Inevitably, single pitch instruments and voices will sometimes be classified as complex signals, hereby invoking harmonic transposition and therefore missing harmonics. Moreover, if switching occurs in the middle of a single pitched signal, or a signal with a dominating pitch in a weaker complex background, the switching itself between the two transposition methods having very different spectrum filling properties will generate audible artifacts.

SUMMARY OF THE INVENTION

The present invention provides a method and system to complete the harmonic series resulting from harmonic transposition of a periodic signal. Frequency domain transposition comprises the step of mapping nonlinearly modified subband signals from an analysis filter bank into selected subbands of a synthesis filter bank. The nonlinear modification comprises a phase modification or phase rotation which in a complex filter bank domain can be obtained by a power law followed by a magnitude adjustment. Whereas prior art transposition modifies one analysis subband at a time separately, the present invention teaches to add a nonlinear combination of at least two different analysis subbands for each synthesis subband. The spacing between the analysis subbands to be combined may be related to the fundamental frequency of a dominant component of the signal to be transposed.

In the most general form, the mathematical description of the invention is that a set of frequency components $\omega_1$, $\omega_2, \ldots, \omega_K$ are used to create a new frequency component $$\omega=T_1\omega_1+T_2\omega_2+ \ldots +T_K\omega_K,$$

where the coefficients $T_1, T_2, \ldots, T_K$ are integer transposition orders whose sum is the total transposition order T=T, $T_1+T_2+ \ldots +T_K$. This effect is obtained by modifying the phases of K suitably chosen subband signals by the factors $T_1, T_2, \ldots, T_K$ and recombining the result into a signal with phase equal to the sum of the modified phases. It is important to note that all these phase operations are well defined and unambiguous since the individual transposition orders are integers, and that some of these integers could even be negative as long as the total transposition order satisfies $T\geq1$.

The prior art methods correspond to the case K=1, and the current invention teaches to use $K\geq2$. The descriptive text treats mainly the case K=2, $T\geq2$ as it is sufficient to solve most specific problems at hand. But it should be noted that the cases K>2 are considered to be equally disclosed and covered by the present document.

The invention uses information from a higher number of lower frequency band analytical channels, i.e. a higher number of analysis subband signals, to map the nonlinearly modified subband signals from an analysis filter bank into selected sub-bands of a synthesis filter bank. The transposition is not just modifying one sub-band at a time separately but it adds a nonlinear combination of at least two different analysis sub-bands for each synthesis sub-band. As already mentioned, harmonic transposition of order T is designed to map a sinusoid of frequency $\omega$ to a sinusoid with frequency $T\omega$, with T>1. According to the invention, a so-called cross product enhancement with pitch parameter $\Omega$ and an index $0<r<T$ is designed to map a pair of sinusoids with frequencies $(\omega,\omega+\Omega)$ to a sinusoid with frequency $(T-r)\omega+r(\omega+\Omega)=T\omega+r\Omega$. It should be appreciated that for such cross product transpositions all partial frequencies of a periodic signal with a period of $\Omega$ will be generated by adding all cross products of pitch parameter $\Omega$, with the index r ranging from 1 to T-1, to the harmonic transposition of order T.

According to an aspect of the invention, a system and a method for generating a high frequency component of a signal from a low frequency component of the signal is described. It should be noted that the features described in the following in the context of a system are equally applicable to the inventive method. The signal may e.g. be an audio and/or a speech signal. The system and method may be used for unified speech and audio signal coding. The signal comprises a low frequency component and a high frequency component, wherein the low frequency component comprises the frequencies below a certain cross-over frequency and the high frequency component comprises the frequencies above the cross-over frequency. In certain circumstances it may be required to estimate the high frequency component of the signal from its low frequency component. By way of example, certain audio encoding schemes only encode the low frequency component of an audio signal and aim at reconstructing the high frequency component of that signal solely from the decoded low frequency component, possibly by using certain information on the envelope of the original high frequency component. The system and method described here may be used in the context of such encoding and decoding systems.

The system for generating the high frequency component comprises an analysis filter bank which provides a plurality of analysis subband signals of the low frequency component of the signal. Such analysis filter banks may comprise a set of bandpass filters with constant bandwidth. Notably in the context of speech signals, it may also be beneficial to use a set of bandpass filters with a logarithmic bandwidth distribution. It is an aim of the analysis filter bank to split up the low frequency component of the signal into its frequency constituents. These frequency constituents will be reflected in the plurality of analysis subband signals generated by the analysis filter bank. By way of example, a signal comprising a note played by musical instrument will be split up into analysis subband signals having a significant magnitude for subbands that correspond to the harmonic frequency of the played note, whereas other subbands will show analysis subband signals with low magnitude.

The system comprises further a non-linear processing unit to generate a synthesis subband signal with a particular synthesis frequency by modifying or rotating the phase of a first and a second of the plurality of analysis subband signals and by combining the phase-modified analysis subband signals. The first and the second analysis subband signals are different, in general. In other words, they correspond to different subbands. The non-linear processing unit may comprise a so-called cross-term processing unit within which the synthesis subband signal is generated. The synthesis subband signal comprises the synthesis frequency. In general, the synthesis subband signal comprises frequencies from a certain synthesis frequency range. The synthesis frequency is a frequency within this frequency range, e.g. a center frequency of the frequency range. The synthesis frequency and also the synthesis frequency range are typically above the cross-over frequency. In an analogous manner the analysis subband signals comprise frequencies from a certain analysis frequency range. These analysis frequency ranges are typically below the cross-over frequency.

The operation of phase modification may consist in transposing the frequencies of the analysis subband signals. Typically, the analysis filter bank yields complex analysis subband signals which may be represented as complex exponentials comprising a magnitude and a phase. The phase of the complex subband signal corresponds to the frequency of the subband signal. A transposition of such subband signals by a certain transposition order T' may be performed by taking the subband signal to the power of the transposition order T'. This results in the phase of the complex subband signal to be multiplied by the transposition order T'. By consequence, the transposed analysis subband signal exhibits a phase or a frequency which is T' times greater than the initial phase or frequency. Such phase modification operation may also be referred to as phase rotation or phase multiplication.

The system comprises, in addition, a synthesis filter bank for generating the high frequency component of the signal from the synthesis subband signal. In other words, the aim of the synthesis filter bank is to merge possibly a plurality of synthesis subband signals from possibly a plurality of synthesis frequency ranges and to generate a high frequency component of the signal in the time domain. It should be noted that for signals comprising a fundamental frequency, e.g. a fundamental frequency Ω, it may be beneficial that the synthesis filter bank and/or the analysis filter bank exhibit a frequency spacing which is associated with the fundamental frequency of the signal. In particular, it may be beneficial to choose filter banks with a sufficiently low frequency spacing or a sufficiently high resolution in order to resolve the fundamental frequency Ω.

According to another aspect of the invention, the non-linear processing unit or the cross-term processing unit within the non-linear processing unit comprises a multiple-input-single-output unit of a first and second transposition order generating the synthesis subband signal from the first and the second analysis subband signal exhibiting a first and a second analysis frequency, respectively. In other words, the multiple-input-single-output unit performs the transposition of the first and second analysis subband signals and merges the two transposed analysis subband signals into a synthesis subband signal. The first analysis subband signal is phase-modified, or its phase is multiplied, by the first transposition order and the second analysis subband signal is phase-modified, or its phase is multiplied, by the second transposition order. In case of complex analysis subband signals such phase modification operation consists in multiplying the phase of the respective analysis subband signal by the respective transposition order. The two transposed analysis subband signals are combined in order to yield a combined synthesis subband signal with a synthesis frequency which corresponds to the first analysis frequency multiplied by the first transposition order plus the second analysis frequency multiplied by the second transposition order. This combination step may consist in the multiplication of the two transposed complex analysis subband signals. Such multiplication between two signals may consist in the multiplication of their samples.

The above mentioned features may also be expressed in terms of formulas. Let the first analysis frequency be ω and the second analysis frequency be (ω+Ω). It should be noted that these variables may also represent the respective analysis frequency ranges of the two analysis subband signals. In other words, a frequency should be understood as representing all the frequencies comprised within a particular frequency range or frequency subband, i.e. the first and second analysis frequency should also be understood as a first and a second analysis frequency range or a first and a second analysis subband. Furthermore, the first transposition order may be (T−r) and the second transposition order may be r. It may be beneficial to restrict the transposition orders such that $T>1$ and $1\leq r<T$. For such cases the multiple-input-single-output unit may yield synthesis subband signals with a synthesis frequency of $(T-r)\cdot\omega+r\cdot(\omega+\Omega)$.

According to a further aspect of the invention, the system comprises a plurality of multiple-input-single-output units and/or a plurality of non-linear processing units which generate a plurality of partial synthesis subband signals having the synthesis frequency. In other words, a plurality of partial synthesis subband signals covering the same synthesis frequency range may be generated. In such cases, a subband summing unit is provided for combining the plurality of partial synthesis subband signals. The combined partial synthesis subband signals then represent the synthesis subband signal. The combining operation may comprise the adding up of the plurality of partial synthesis subband signals. It may also comprise the determination of an average synthesis subband signal from the plurality of partial synthesis subband signals, wherein the synthesis subband signals may be weighted according to their relevance for the synthesis subband signal. The combining operation may also comprise the selecting of one or some of the plurality of subband signals which e.g. have a magnitude which exceeds a pre-defined threshold value. It should be noted that it may be beneficial that the synthesis subband signal is multiplied by a gain parameter. Notably in cases, where there is a plurality of partial synthesis subband signals, such gain parameters may contribute to the normalization of the synthesis subband signals.

According to a further aspect of the invention, the non-linear processing unit further comprises a direct processing unit for generating a further synthesis subband signal from a third of the plurality of analysis subband signals. Such direct processing unit may execute the direct transposition methods described e.g. in WO 98/57436. If the system comprises an additional direct processing unit, then it may be necessary to provide a subband summing unit for combining corresponding synthesis subband signals. Such corresponding synthesis subband signals are typically subband signals covering the same synthesis frequency range and/or exhibiting the same synthesis frequency. The subband summing unit may perform the combination according to the aspects outlined above. It may also ignore certain synthesis subband signals, notably the once generated in the multiple-input-single-output units, if the minimum of the magnitude of the one or more analysis subband signals, e.g. from the cross-terms contributing to the synthesis subband signal, are smaller than a pre-defined fraction of the magnitude of the signal. The signal may be the low frequency component of the signal or a particular analysis subband signal. This signal may also be a particular synthesis subband signal. In other words, if the energy or magnitude of the analysis subband signals used for generating the synthesis subband signal is too small, then this synthesis subband signal may not be used for generating a high frequency component of the signal. The energy or magnitude may be determined for each sample or it may be determined for a set of samples, e.g. by determining a time average or a sliding window average across a plurality of adjacent samples, of the analysis subband signals.

The direct processing unit may comprise a single-input-single-output unit of a third transposition order T', generating the synthesis subband signal from the third analysis subband signal exhibiting a third analysis frequency, wherein the third analysis subband signal is phase-modified, or its phase is multiplied, by the third transposition order T' and wherein T' is greater than one. The synthesis frequency then corresponds to the third analysis frequency multiplied by the third transposition order. It should be noted that this third transposition order T' is preferably equal to the system transposition order T introduced below.

According to another aspect of the invention, the analysis filter bank has N analysis subbands at an essentially constant subband spacing of $\Delta\omega$. As mentioned above, this subband spacing $\Delta\omega$ may be associated with a fundamental frequency of the signal. An analysis subband is associated with an analysis subband index n, where $n \in \{1, \ldots, N\}$. In other words, the analysis subbands of the analysis filter bank may be identified by a subband index n. In a similar manner, the analysis subband signals comprising frequencies from the frequency range of the corresponding analysis subband may be identified with the subband index n.

On the synthesis side, the synthesis filter bank has a synthesis subband which is also associated with a synthesis subband index n. This synthesis subband index n also identifies the synthesis subband signal which comprises frequencies from the synthesis frequency range of the synthesis subband with subband index n. If the system has a system transposition order, also referred to as the total transposition order, T, then the synthesis subbands typically have an essentially constant subband spacing of $\Delta\omega \cdot T$, i.e. the subband spacing of the synthesis subbands is T times greater than the subband spacing of the analysis subbands. In such cases, the synthesis subband and the analysis subband with index n each comprise frequency ranges which relate to each other through the factor or the system transposition order T. By way of example, if the frequency range of the analysis subband with index n is $[(n-1)\cdot\omega, n\cdot\omega]$, then the frequency range of the synthesis subband with index n is $[T\cdot(n-1)\cdot\omega, T\cdot n\cdot\omega]$.

Given that the synthesis subband signal is associated with the synthesis subband with index n, another aspect of the invention is that this synthesis subband signal with index n is generated in a multiple-input-single-output unit from a first and a second analysis subband signal. The first analysis subband signal is associated with an analysis subband with index $n-p_1$ and the second analysis subband signal is associated with an analysis subband with index $n+p_2$.

In the following, several methods for selecting a pair of index shifts $(p_1, p_2)$ are outlined. This may be performed by a so-called index selection unit. Typically, an optimal pair of index shifts is selected in order to generate a synthesis subband signal with a pre-defined synthesis frequency. In a first method, the index shifts $p_1$ and $p_2$ are selected from a limited list of pairs $(p_1, p_2)$ stored in an index storing unit. From this limited list of index shift pairs, a pair $(p_1, p_2)$ could be selected such that the minimum value of a set comprising the magnitude of the first analysis subband signal and the magnitude of the second analysis subband signal is maximized. In other words, for each possible pair of index shifts $p_1$ and $p_2$ the magnitude of the corresponding analysis subband signals could be determined. In case of complex analysis subband signals, the magnitude corresponds to the absolute value. The magnitude may be determined for each sample or it may be determined for a set of samples, e.g. by determining a time average or a sliding window average across a plurality of adjacent samples, of the analysis subband signal. This yields a first and a second magnitude for the first and second analysis subband signal, respectively. The minimum of the first and the second magnitude is considered and the index shift pair $(p_1, p_2)$ is selected for which this minimum magnitude value is highest.

In another method, the index shifts $p_1$ and $p_2$ are selected from a limited list of pairs $(p_1, p_2)$, wherein the limited list is determined through the formulas $p_1=r\cdot l$ and $p_2=(T-r)\cdot l$. In these formulas l is a positive integer, taking on values e.g. from 1 to 10. This method is particularly useful in situations where the first transposition order used to transpose the first analysis subband $(n-p_1)$ is $(T-r)$ and where the second transposition order used to transpose the second analysis subband $(n+p_2)$ is r. Assuming that the system transposition order T is fixed, the parameters l and r may be selected such that the minimum value of a set comprising the magnitude of the first analysis subband signal and the magnitude of the second analysis subband signal is maximized. In other words, the parameters l and r may be selected by a max-min optimization approach as outlined above.

In a further method, the selection of the first and second analysis subband signals may be based on characteristics of the underlying signal. Notably, if the signal comprises a fundamental frequency $\Omega$, i.e. if the signal is periodic with pulse-train like character, it may be beneficial to select the index shifts $p_1$ and $p_2$ in consideration of such signal characteristic. The fundamental frequency $\Omega$ may be determined from the low frequency component of the signal or it may be determined from the original signal, comprising both, the low and the high frequency component. In the first case, the fundamental frequency $\Omega$ could be determined at a signal decoder using high frequency reconstruction, while in the second case the fundamental frequency $\Omega$ would typically be determined at a signal encoder and then signaled to the corresponding signal decoder. If an analysis filter bank with a subband spacing of $\Delta\omega$ is used and if the first transposition order used to transpose the first analysis subband $(n-p_1)$ is $(T-r)$ and if the second transposition order used to transpose the second analysis subband $(n+p_2)$ is r then $p_1$ and $p_2$ may be selected such that their sum $p_1+p_2$ approximates the fraction $\Omega/\Delta\omega$ and their fraction $p_1/p_2$ approximates $r/(T-r)$. In a particular case, $p_1$ and $p_2$ are selected such that the fraction $p_1/p_2$ equals $r/(T-r)$.

According to another aspect of the invention, the system for generating a high frequency component of a signal also comprises an analysis window which isolates a pre-defined time interval of the low frequency component around a pre-defined time instance k. The system may also comprise a synthesis window which isolates a pre-defined time interval of the high frequency component around a pre-defined time instance k. Such windows are particularly useful for signals with frequency constituents which are changing over time. They allow analyzing the momentary frequency composition of a signal. In combination with the filter banks a typical example for such time-dependent frequency analysis is the Short Time Fourier Transform (STFT). It should be noted that often the analysis window is a time-spread version of the synthesis window. For a system with a system order transposition T, the analysis window in the time domain may be a time spread version of the synthesis window in the time domain with a spreading factor T.

According to a further aspect of the invention, a system for decoding a signal is described. The system takes an encoded version of the low frequency component of a signal and comprises a transposition unit, according to the system described above, for generating the high frequency component of the signal from the low frequency component of the signal. Typically such decoding systems further comprise a core decoder for decoding the low frequency component of the signal. The decoding system may further comprise an upsampler for performing an upsampling of the low frequency component to yield an upsampled low frequency component. This may be required, if the low frequency component of the signal has been down-sampled at the encoder, exploiting the fact that the low frequency component only covers a reduced frequency range compared to the original signal. In addition, the decoding system may comprise an input unit for receiving the encoded signal, comprising the low frequency component, and an output unit for providing the decoded signal, comprising the low and the generated high frequency component.

The decoding system may further comprise an envelope adjuster to shape the high frequency component. While the high frequencies of a signal may be re-generated from the low frequency range of a signal using the high frequency reconstruction systems and methods described in the present document, it may be beneficial to extract information from the original signal regarding the spectral envelope of its high frequency component. This envelope information may then be provided to the decoder, in order to generate a high frequency component which approximates well the spectral envelope of the high frequency component of the original signal. This operation is typically performed in the envelope adjuster at the decoding system. For receiving information related to the envelope of the high frequency component of the signal, the decoding system may comprise an envelope data reception unit. The regenerated high frequency component and the decoded and possibly upsampled low frequency component may then be summed up in a component summing unit to determine the decoded signal.

As outlined above, the system for generating the high frequency component may use information with regards to the analysis subband signals which are to be transposed and combined in order to generate a particular synthesis subband signal. For this purpose, the decoding system may further comprise a subband selection data reception unit for receiving information which allows the selection of the first and second analysis subband signals from which the synthesis subband signal is to be generated. This information may be related to certain characteristics of the encoded signal, e.g. the information may be associated with a fundamental frequency Ω of the signal. The information may also be directly related to the analysis subbands which are to be selected. By way of example, the information may comprise a list of possible pairs of first and second analysis subband signals or a list of pairs $(p_1, p_2)$ of possible index shifts.

According to another aspect of the invention an encoded signal is described. This encoded signal comprises information related to a low frequency component of the decoded signal, wherein the low frequency component comprises a plurality of analysis subband signals. Furthermore, the encoded signal comprises information related to which two of the plurality of analysis subband signals are to be selected to generate a high frequency component of the decoded signal by transposing the selected two analysis subband signals. In other words, the encoded signal comprises a possibly encoded version of the low frequency component of a signal. In addition, it provides information, such as a fundamental frequency Ω of the signal or a list of possible index shift pairs $(p_1,p_2)$, which will allow a decoder to regenerate the high frequency component of the signal based on the cross product enhanced harmonic transposition method outlined in the present document.

According to a further aspect of the invention, a system for encoding a signal is described. This encoding system comprises a splitting unit for splitting the signal into a low frequency component and into a high frequency component and a core encoder for encoding the low frequency component. It also comprises a frequency determination unit for determining a fundamental frequency Ω of the signal and a parameter encoder for encoding the fundamental frequency Ω, wherein the fundamental frequency Ω is used in a decoder to regenerate the high frequency component of the signal. The system may also comprise an envelope determination unit for determining the spectral envelope of the high frequency component and an envelope encoder for encoding the spectral envelope. In other words, the encoding system removes the high frequency component of the original signal and encodes the low frequency component by a core encoder, e.g. an AAC or Dolby D encoder. Furthermore, the encoding system analyzes the high frequency component of the original signal and determines a set of information that is used at the decoder to regenerate the high frequency component of the decoded signal. The set of information may comprise a fundamental frequency Ω of the signal and/or the spectral envelope of the high frequency component.

The encoding system may also comprise an analysis filter bank providing a plurality of analysis subband signals of the low frequency component of the signal. Furthermore, it may comprise a subband pair determination unit for determining a first and a second subband signal for generating a high frequency component of the signal and an index encoder for encoding index numbers representing the determined first and the second subband signal. In other words, the encoding system may use the high frequency reconstruction method and/or system described in the present document in order to determine the analysis subbands from which high frequency subbands and ultimately the high frequency component of the signal may be generated. The information on these subbands, e.g. a limited list of index shift pairs $(p_1,p_2)$, may then be encoded and provided to the decoder.

As highlighted above, the invention also encompasses methods for generating a high frequency component of a signal, as well as methods for decoding and encoding signals. The features outlined above in the context of systems are equally applicable to corresponding methods. In the following selected aspects of the methods according to the invention are outlined. In a similar manner these aspects are also applicable to the systems outlined in the present document.

According to another aspect of the invention, a method for performing high frequency reconstruction of a high frequency component from a low frequency component of a signal is described. This method comprises the step of providing a first subband signal of the low frequency component from a first frequency band and a second subband signal of the low frequency component from a second frequency band. In other words, two subband signals are isolated from the low frequency component of the signal, the first subband signal encompasses a first frequency band and the second subband signal encompasses a second frequency band. The two frequency subbands are preferably different. In a further step, the first and the second subband signals are transposed by a first and a second transposition factor, respectively. The transposition of each subband signal may be performed according to known methods for transposing signals. In case of complex subband signals, the transposition may be performed by modifying the phase, or by multiplying the phase, by the respective transposition factor or transposition order. In a further step, the transposed first and second subband signals are combined to yield a high frequency component which comprises frequencies from a high frequency band.

The transposition may be performed such that the high frequency band corresponds to the sum of the first frequency band multiplied by the first transposition factor and the second frequency band multiplied by the second transposition factor. Furthermore, the transposing step may comprise the steps of multiplying the first frequency band of the first subband signal with the first transposition factor and of multiplying the second frequency band of the second subband signal with the second transposition factor. To simplify the explanation and without limiting its scope, the invention is illustrated for transposition of individual frequencies. It should be noted, however, that the transposition is performed not only for individual frequencies, but also for entire frequency bands, i.e. for a plurality of frequencies comprised within a frequency band. As a matter of fact, the transposition of frequencies and the transposition of frequency bands should be understood as being interchangeable in the present document. However, one has to be aware of different frequency resolutions of the analysis and synthesis filterbanks.

In the above mentioned method, the providing step may comprise the filtering of the low frequency component by an analysis filter bank to generate a first and a second subband signal. On the other side, the combining step may comprise multiplying the first and the second transposed subband signals to yield a high subband signal and inputting the high subband signal into a synthesis filter bank to generate the high frequency component. Other signal transformations into and from a frequency representation are also possible and within the scope of the invention. Such signal transformations comprise Fourier Transforms (FFT, DCT), wavelet transforms, quadrature mirror filters (QMF), etc. Furthermore, these transforms also comprise window functions for the purpose of isolating a reduced time interval of the "to be transformed" signal. Possible window functions comprise Gaussian windows, cosine windows, Hamming windows, Hann windows, rectangular windows, Barlett windows, Blackman windows, and others. In this document the term "filter bank" may comprise any such transforms possibly combined with any such window functions.

According to another aspect of the invention, a method for decoding an encoded signal is described. The encoded signal is derived from an original signal and represents only a portion of frequency subbands of the original signal below a cross-over frequency. The method comprises the steps of providing a first and a second frequency subband of the encoded signal. This may be done by using an analysis filter bank. Then the frequency subbands are transposed by a first transposition factor and a second transposition factor, respectively. This may be done by performing a phase modification, or a phase multiplication, of the signal in the first frequency subband with the first transposition factor and by performing a phase modification, or a phase multiplication, of the signal in the second frequency subband with the second transposition factor. Finally, a high frequency subband is generated from the first and second transposed frequency subbands, wherein the high frequency subband is above the cross-over frequency. This high frequency subband may correspond to the sum of the first frequency subband multiplied by the first transposition factor and the second frequency subband multiplied by the second transposition factor.

According to another aspect of the invention, a method for encoding a signal is described. This method comprises of the steps of filtering the signal to isolate a low frequency of the signal and of encoding the low frequency component of the signal. Furthermore, a plurality of analysis subband signals of the low frequency component of the signal is provided. This may be done using an analysis filter bank as described in the present document. Then a first and a second subband signal for generating a high frequency component of the signal are determined. This may be done using the high frequency reconstruction methods and systems outlined in the present document. Finally, information representing the determined first and the second subband signal is encoded. Such information may be characteristics of the original signal, e.g. the fundamental frequency Ω of the signal, or information related to the selected analysis subbands, e.g. the index shift pairs $(p_1,p_2)$.

It should be noted that the above mentioned embodiments and aspects of the invention may be arbitrarily combined. In particular, it should be noted that the aspects outlined for a system are also applicable to the corresponding method embraced by the present invention. Furthermore, it should be noted that the disclosure of the invention also covers other claim combinations than the claim combinations which are explicitly given by the back references in the dependent claims, i.e., the claims and their technical features can be combined in any order and any formation.

BRIEF DESCRIPTION OF THE DRAWINGS

The present invention will now be described by way of illustrative examples, not limiting the scope of the invention. It will be described with reference to the accompanying drawings, in which.

DESCRIPTION OF PREFERRED EMBODIMENTS

The below-described embodiments are merely illustrative for the principles of the present invention for the so-called CROSS PRODUCT ENHANCED HARMONIC TRANSPOSITION. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

Figure 1:
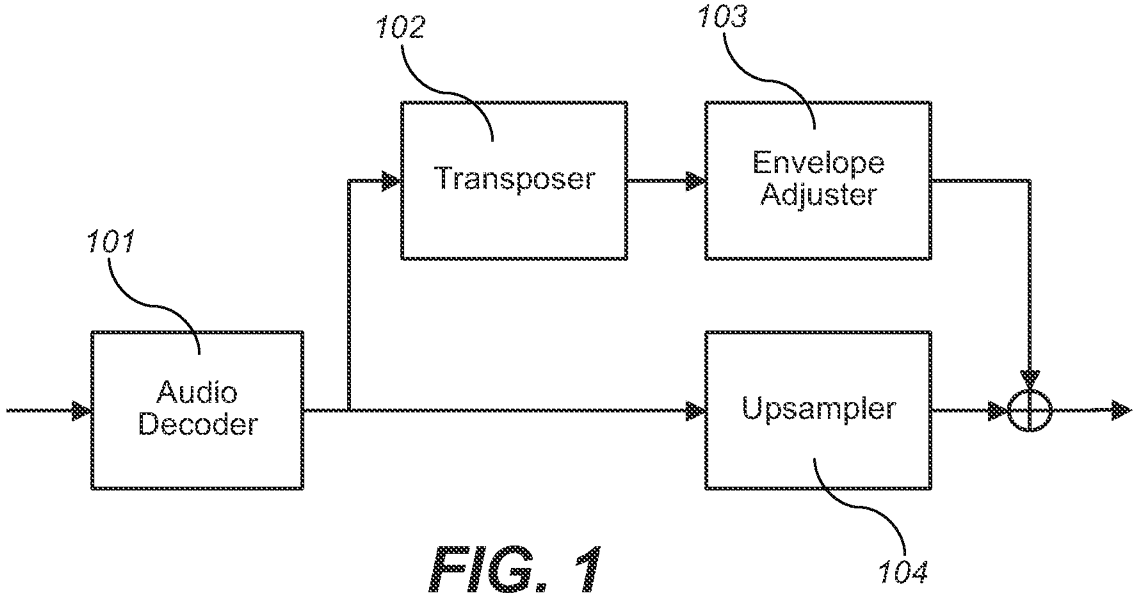
FIG. 1 illustrates the operation of an HFR enhanced audio decoder.

FIG. 1 illustrates the operation of an HFR enhanced audio decoder. The core audio decoder 101 outputs a low bandwidth audio signal which is fed to an upsampler 104 which may be required in order to produce a final audio output contribution at the desired full sampling rate. Such upsampling is required for dual rate systems, where the band limited core audio codec is operating at half the external audio sampling rate, while the HFR part is processed at the full sampling frequency. Consequently, for a single rate system, this upsampler 104 is omitted. The low bandwidth output of 101 is also sent to the transposer or the transposition unit 102 which outputs a transposed signal, i.e. a signal comprising the desired high frequency range. This transposed signal may be shaped in time and frequency by the envelope adjuster 103. The final audio output is the sum of low bandwidth core signal and the envelope adjusted transposed signal.

Figure 2:
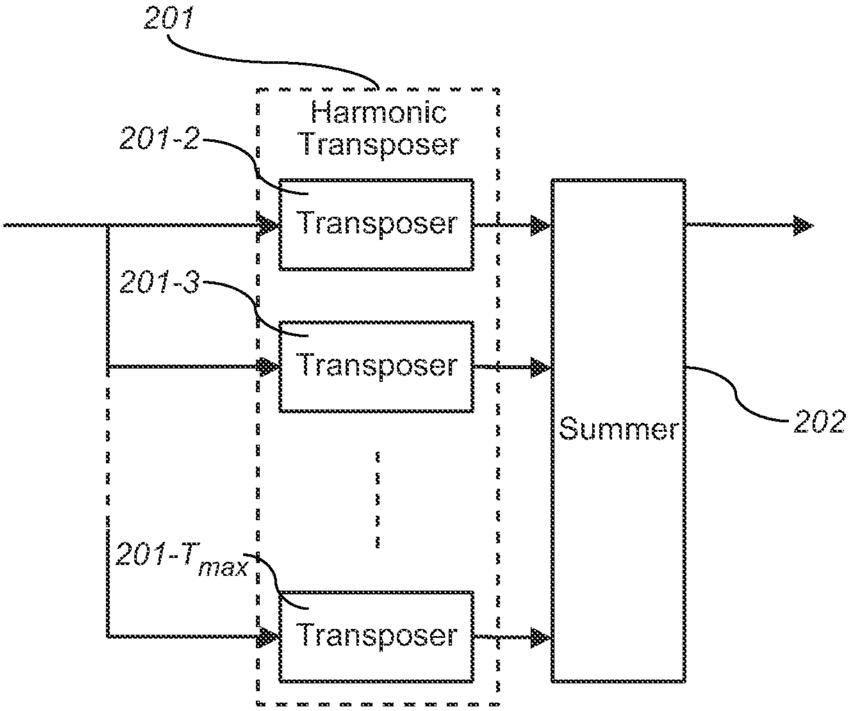
FIG. 2 illustrates the operation of a harmonic transposer using several orders.

FIG. 2 illustrates the operation of a harmonic transposer 201, which corresponds to the transposer 102 of FIG. 1, comprising several transposers of different transposition order T. The signal to be transposed is passed to the bank of individual transposers 201-2, 201-3, . . . , 201-$T_{max}$ having orders of transposition T=2,3, . . . , $T_{max}$, respectively. Typically a transposition order $T_{max}=3$ suffices for most audio coding applications. The contributions of the different transposers 201-2, 201-3, . . . , 201-$T_{max}$ are summed in 202 to yield the combined transposer output. In a first embodiment, this summing operation may comprise the adding up of the individual contributions. In another embodiment, the contributions are weighted with different weights, such that the effect of adding multiple contributions to certain frequencies is mitigated. For instance, the third order contributions may be added with a lower gain than the second order contributions. Finally, the summing unit 202 may add the contributions selectively depending on the output frequency. For instance, the second order transposition may be used for a first lower target frequency range, and the third order transposition may be used for a second higher target frequency range.

Figure 3:
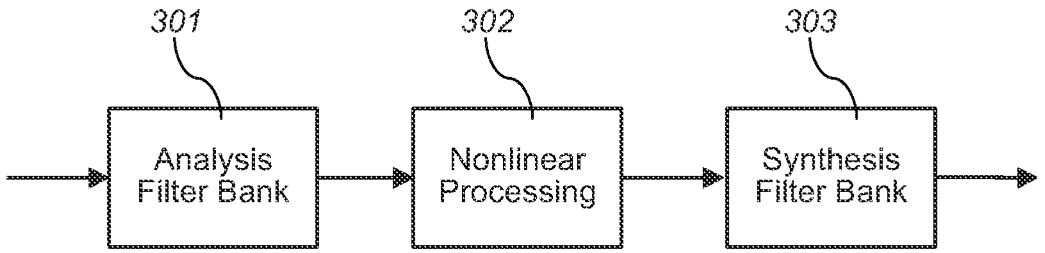
FIG. 3 illustrates the operation of a frequency domain (FD) harmonic transposer.

FIG. 3 illustrates the operation of a frequency domain (FD) harmonic transposer, such as one of the individual blocks of 201, i.e. one of the transposers 201-T of transposition order T. An analysis filter bank 301 outputs complex subbands that are submitted to nonlinear processing 302, which modifies the phase and/or amplitude of the subband signal according to the chosen transposition order T. The modified subbands are fed to a synthesis filterbank 303 which outputs the transposed time domain signal. In the case of multiple parallel transposers of different transposition orders such as shown in FIG. 2, some filter bank operations may be shared between different transposers 201-2, 201-3, . . . , 201-$T_{max}$. The sharing of filter bank operations may be done for analysis or synthesis. In the case of shared synthesis 303, the summing 202 can be performed in the subband domain, i.e. before the synthesis 303.

Figure 4:
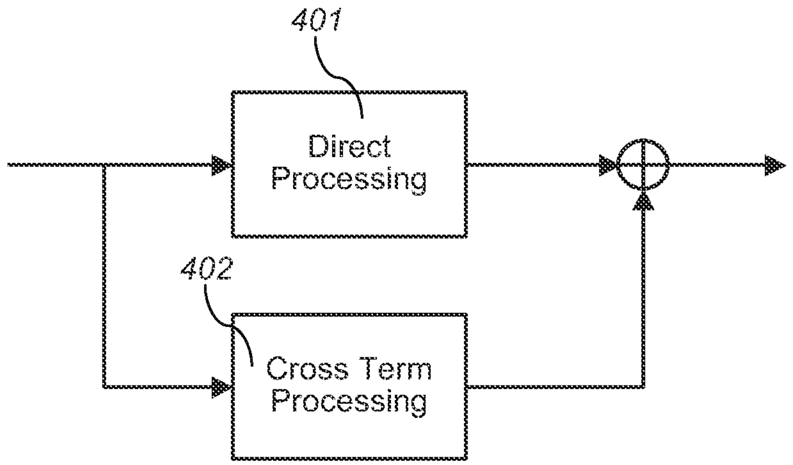
FIG. 4 illustrates the operation of the inventive use of cross term processing.

FIG. 4 illustrates the operation of cross term processing 402 in addition to the direct processing 401. The cross term processing 402 and the direct processing 401 are performed in parallel within the nonlinear processing block 302 of the frequency domain harmonic transposer of FIG. 3. The transposed output signals are combined, e.g. added, in order to provide a joint transposed signal. This combination of transposed output signals may consist in the superposition of the transposed output signals. Optionally, the selective addition of cross terms may be implemented in the gain computation.

Figure 5:
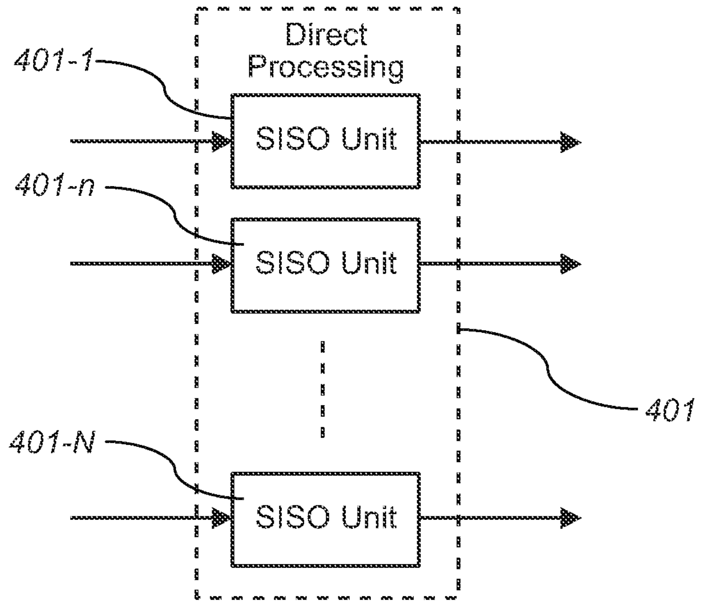
FIG. 5 (PRIOR ART)
FIG. 5 illustrates prior art direct processing.

FIG. 5 illustrates in more detail the operation of the direct processing block 401 of FIG. 4 within the frequency domain harmonic transposer of FIG. 3. Single-input-single-output (SISO) units 401-1, . . . , 401-*n*, . . . , 401-N map each analysis subband from a source range into one synthesis subband in a target range. According to the FIG. 5, an analysis subband of index n is mapped by the SISO unit 401-*n* to a synthesis subband of the same index n. It should be noted that the frequency range of the subband with index n in the synthesis filter bank may vary depending on the exact version or type of harmonic transposition. In the version or type illustrated in FIG. 5, the frequency spacing of the analysis bank 301 is a factor T smaller than that of the synthesis bank 303. Hence, the index n in the synthesis bank 303 corresponds to a frequency, which is T times higher than the frequency of the subband with the same index n in the analysis bank 301. By way of example, an analysis subband [(n-1)ω,nω] is transposed into a synthesis subband [(n-1)Tω,nTω].

Figure 6:
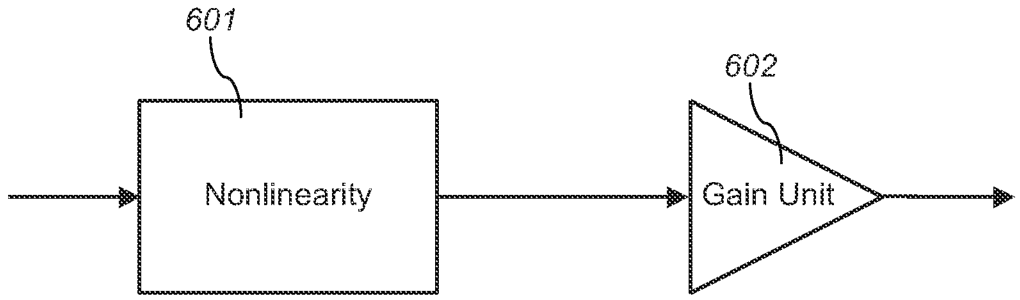
FIG. 6 (PRIOR ART)
FIG. 6 illustrates prior art direct nonlinear processing of a single sub-band.

FIG. 6 illustrates the direct nonlinear processing of a single subband contained in each of the SISO units of 401-*n*. The nonlinearity of block 601 performs a multiplication of the phase of the complex subband signal by a factor equal to the transposition order T. The optional gain unit 602 modifies the magnitude of the phase modified subband signal. In mathematical terms, the output y of the SISO unit 401-*n* can be written as a function of the input x to the SISO system 401-*n* and the gain parameter g as follows:

$$y=g\cdot v^T,\text{ where } v=x/|x|^{1-1/T}. \tag{1}$$

This may also be written as:

$$y = g\cdot|x|\cdot\left(\frac{x}{|x|}\right)^T.$$

In words, the phase of the complex subband signal x is multiplied by the transposition order T and the amplitude of the complex subband signal x is modified by the gain parameter g.

Figure 7:
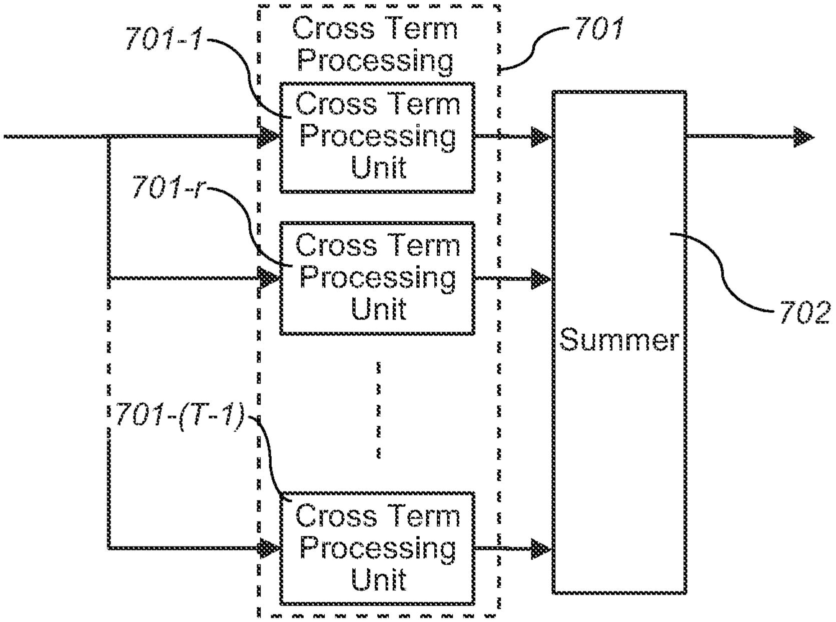
FIG. 7 illustrates the components of the inventive cross term processing.

FIG. 7 illustrates the components of the cross term processing 402 for an harmonic transposition of order T. There are T-1 cross term processing blocks in parallel, 701-1, . . . , 701-*r*, . . . 701-(T-1), whose outputs are summed in the summing unit 702 to produce a combined output. As already pointed out in the introductory section, it is a target to map a pair of sinusoids with frequencies $(\omega,\omega+\Omega)$ to a sinusoid with frequency $(T-r)\omega+r(\omega+\Omega)=T\omega+r\Omega$, wherein the variable r varies from 1 to T-1. In other words, two subbands from the analysis filter bank 301 are to be mapped to one subband of the high frequency range. For a particular value of r and a given transposition order T, this mapping step is performed in the cross term processing block 701-*r*.

Figure 8:
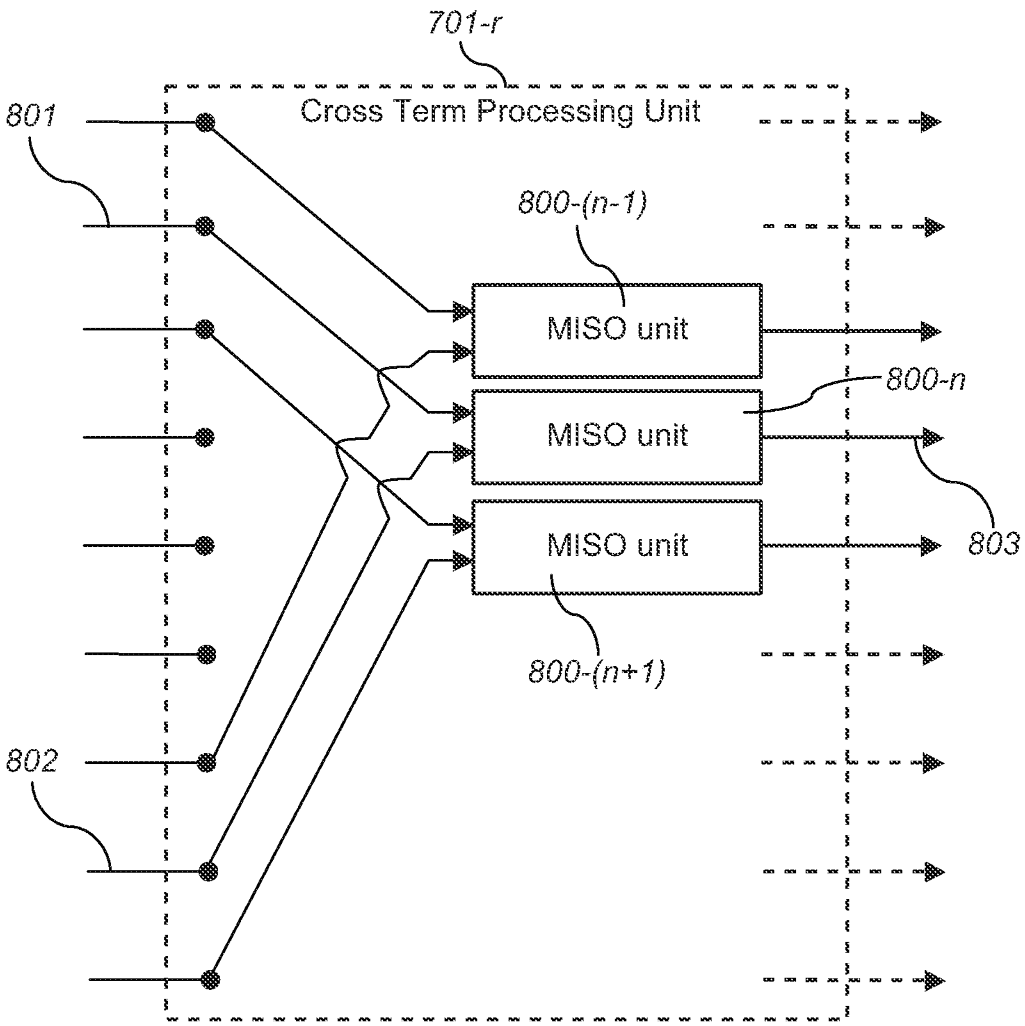
FIG. 8 illustrates the operation of a cross term processing block.

FIG. 8 illustrates the operation of a cross term processing block 701-*r* for a fixed value r=1,2, . . . ,T-1. Each output subband 803 is obtained in a multiple-input-single-output (MISO) unit 800-*n* from two input subbands 801 and 802. For an output subband 803 of index n, the two inputs of the MISO unit 800-*n* are subbands $n-p_1$, 801, and $n+p_2$, 802, where $p_1$ and $p_2$ are positive integer index shifts, which depend on the transposition order T, the variable r, and the cross product enhancement pitch parameter Ω. The analysis and synthesis subband numbering convention is kept in line with that of FIG. 5, that is, the spacing in frequency of the analysis bank 301 is a factor T smaller than that of the synthesis bank 303 and consequently the above comments given on variations of the factor T remain relevant.

In relation to the usage of cross term processing, the following remarks should be considered. The pitch parameter Ω does not have to be known with high precision, and certainly not with better frequency resolution than the frequency resolution obtained by the analysis filter bank 301. In fact, in some embodiments of the present invention, the underlying cross product enhancement pitch parameter Ω is not entered in the decoder at all. Instead, the chosen pair of integer index shifts $(p_1, p_2)$ is selected from a list of possible candidates by following an optimization criterion such as the maximization of the cross product output magnitude, i.e. the maximization of the energy of the cross product output. By way of example, for given values of T and r, a list of candidates given by the formula $(p_1, p_2)$ $(rl,(T-r)l), l\in L$, where L is a list of positive integers, could be used. This is shown in further detail below in the context of formula (11). All positive integers are in principle OK as candidates. In some cases pitch information may help to identify which l to choose as appropriate index shifts.

Furthermore, even though the example cross product processing illustrated in FIG. 8 suggests that the applied index shifts $(p_1, p_2)$ are the same for a certain range of output subbands, e.g. synthesis subbands (n−1), n and (n+1) are composed from analysis subbands having a fixed distance $p_1+p_2$, this need not be the case. As a matter of fact, the index shifts $(p_1, p_2)$ may differ for each and every output subband. This means that for each subband n a different value Q of the cross product enhancement pitch parameter may be selected.

Figure 9:
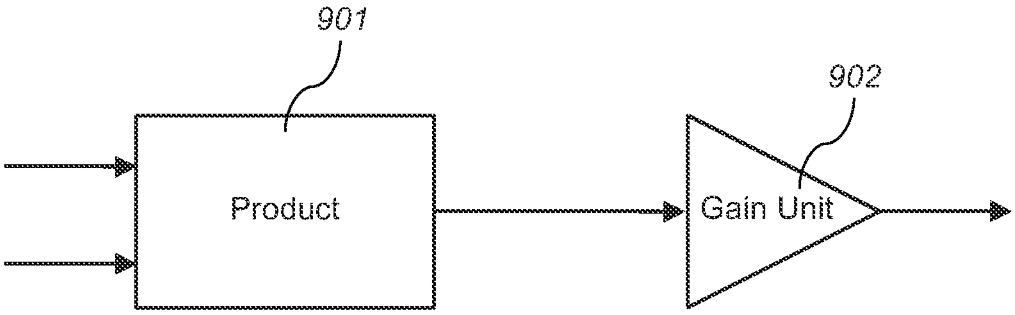
FIG. 9 illustrates the inventive nonlinear processing contained in each of the MISO systems of FIG. 8.

FIG. 9 illustrates the nonlinear processing contained in each of the MISO units 800-*n*. The product operation 901 creates a subband signal with a phase equal to a weighted sum of the phases of the two complex input subband signals and a magnitude equal to a generalized mean value of the magnitudes of the two input subband samples. The optional gain unit 902 modifies the magnitude of the phase modified subband samples. In mathematical terms, the output y can be written as a function of the inputs $u_1$ 801 and $u_2$ 802 to the MISO unit 800-*n* and the gain parameter g as follows, $$y=g\cdot v_1^{T-f}v_2^{r},\ \text{where } v_m=u_m/|u_m|^{1-1/T},\ \text{for } m=1,2. \tag{2}$$

This may also be written as:

$$y=\mu(|u_1|,|u_2|)\cdot\left(\frac{u_1}{|u_1|}\right)^{T-r}\left(\frac{u_2}{|u_2|}\right)^{T},$$

where $\mu(|u_1|,|u_2|)$ is a magnitude generation function. In words, the phase of the complex subband signal $u_1$ is multiplied by the transposition order T-r and the phase of the complex subband signal $u_2$ is multiplied by the transposition order r. The sum of those two phases is used as the phase of the output y whose magnitude is obtained by the magnitude generation function. Comparing with the formula (2) the magnitude generation function is expressed as the geometric mean of magnitudes modified by the gain parameter g, that is $\mu(|u_1|,|u_2|)=g\cdot|u_1|^{1-r/T}|u_2|^{r/T}$. By allowing the gain parameter to depend on the inputs this of course covers all possibilities.

It should be noted that the formula (2) results from the underlying target that a pair of sinusoids with frequencies $(\omega,\omega+\Omega)$ are to be mapped to a sinusoid with frequency $T\omega+r\Omega$, which can also be written as $(T-r)\omega+r(\omega+\Omega)$.

In the following text, a mathematical description of the present invention will be outlined. For simplicity, continuous time signals are considered. The synthesis filter bank 303 is assumed to achieve perfect reconstruction from a corresponding complex modulated analysis filter bank 301 with a real valued symmetric window function or prototype filter w(t). The synthesis filter bank will often, but not always, use the same window in the synthesis process. The modulation is assumed to be of an evenly stacked type, the stride is normalized to one and the angular frequency spacing of the synthesis subbands is normalized to π. Hence, a target signal s(t) will be achieved at the output of the synthesis filter bank if the input subband signals to the synthesis filter bank are given by synthesis subband signals $y_n(k)$, $$y_n(k)=\int_{-\infty}^{\infty}s(t)w(t-k)\exp[-in\pi(t-k)]dt. \tag{3}$$

Note that formula (3) is a normalized continuous time mathematical model of the usual operations in a complex modulated subband analysis filter bank, such as a windowed Discrete Fourier Transform (DFT), also denoted as a Short Time Fourier Transform (STFT). With a slight modification in the argument of the complex exponential of formula (3), one obtains continuous time models for complex modulated (pseudo) Quadrature Mirror Filterbank (QMF) and complexified Modified Discrete Cosine Transform (CMDCT), also denoted as a windowed oddly stacked windowed DFT. The subband index n runs through all nonnegative integers for the continuous time case. For the discrete time counterparts, the time variable t is sampled at step 1/N, and the subband index n is limited by N, where N is the number of subbands in the filter bank, which is equal to the discrete time stride of the filter bank. In the discrete time case, a normalization factor related to N is also required in the transform operation if it is not incorporated in the scaling of the window.

For a real valued signal, there are as many complex subband samples out as there are real valued samples in for the chosen filter bank model. Therefore, there is a total oversampling (or redundancy) by a factor two. Filter banks with a higher degree of oversampling can also be employed, but the oversampling is kept small in the present description of embodiments for the clarity of exposition.

The main steps involved in the modulated filter bank analysis corresponding to formula (3) are that the signal is multiplied by a window centered around time t=k, and the resulting windowed signal is correlated with each of the complex sinusoids exp[−inπ(t-k)]. In discrete time implementations this correlation is efficiently implemented via a Fast Fourier Transform. The corresponding algorithmic steps for the synthesis filter bank are well known for those skilled in the art, and consist of synthesis modulation, synthesis windowing, and overlap add operations.

Figure 19:
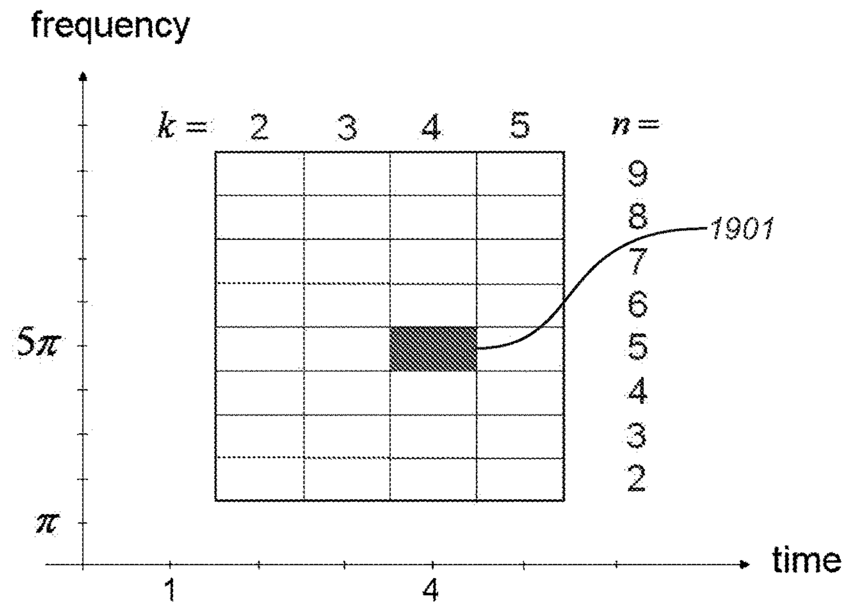
FIG. 19 illustrates the time-frequency resolution of a Short Time Fourier Transform (STFT)

FIG. 19 illustrates the position in time and frequency corresponding to the information carried by the subband sample $y_n(k)$ for a selection of values of the time index k and the subband index n. As an example, the subband sample $y_5(4)$ is represented by the dark rectangle 1901.

For a sinusoid, s(t)=Acos(ωt+θ)=Re{Cexp(iωt)}, the subband signals of (3) are for sufficiently large n with good approximation given by $$y_n(k) = Ce^{ik\omega}\int_{-\infty}^{\infty} w(t)\exp[-i(n\pi-\omega)t]dt = Ce^{ik\omega}\hat{w}(n\pi-\omega), \tag{4}$$

where the hat denotes the Fourier transform, i.e. ŵ is the Fourier transform of the window function w.

Strictly speaking, formula (4) is only true if one adds a term with −ω instead of ω. This term is neglected based on the assumption that the frequency response of the window decays sufficiently fast, and that the sum of ω and n is not close to zero.

Figure 20:
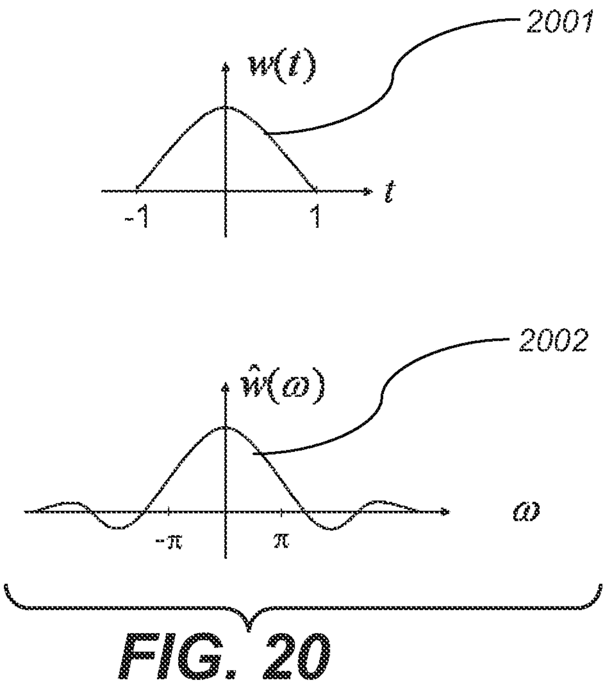
FIG. 20 illustrates the exemplary time progression of a window function and its Fourier transform used on the synthesis side.

FIG. 20 depicts the typical appearance of a window w, 2001, and its Fourier transform ŵ, 2002.

Figure 21:
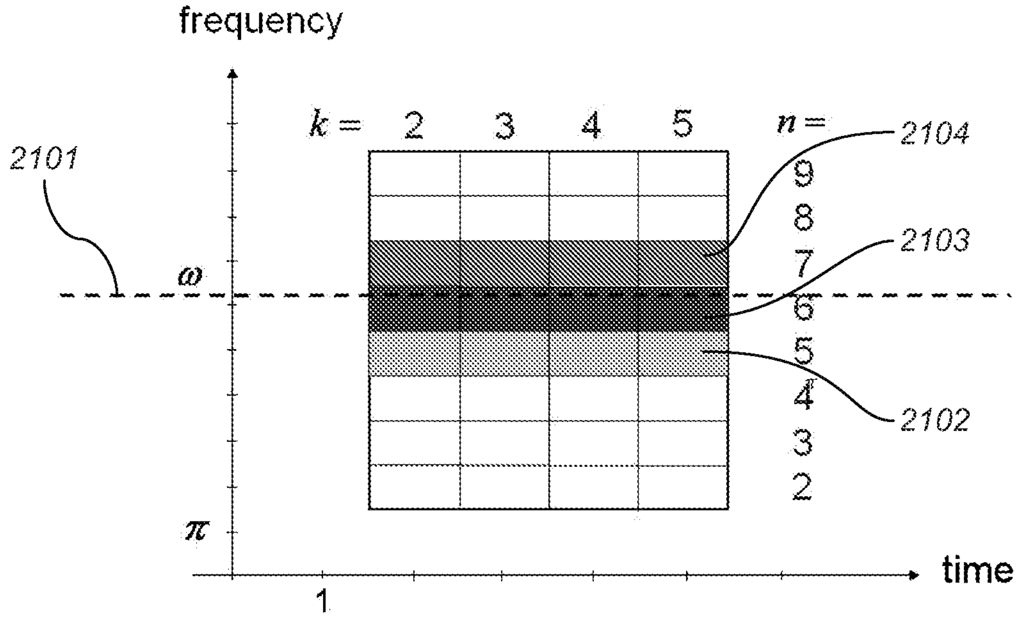
FIG. 21 illustrates the STFT of a sinusoidal input signal.

FIG. 21 illustrates the analysis of a single sinusoid corresponding to formula (4). The subbands that are mainly affected by the sinusoid at frequency ω are those with index n such that nπ-ω is small. For the example of FIG. 21, the frequency is ω=6.25π as indicated by the horizontal dashed line 2101. In that case, the three subbands for n=5, 6, 7, represented by reference signs 2102, 2103, 2104, respectively, contain significant nonzero subband signals. The shading of those three subbands reflects the relative amplitude of the complex sinusoids inside each subband obtained from formula (4). A darker shade means higher amplitude. In the concrete example, this means that the amplitude of subband 5, i.e. 2102, is lower compared to the amplitude of subband 7, i.e. 2104, which again is lower than the amplitude of subband 6, i.e. 2103. It is important to note that several nonzero subbands may in general be necessary to be able to synthesize a high quality sinusoid at the output of the synthesis filter bank, especially in cases where the window has an appearance like the window 2001 of FIG. 20, with relatively short time duration and significant side lobes in frequency.

Figure 22:
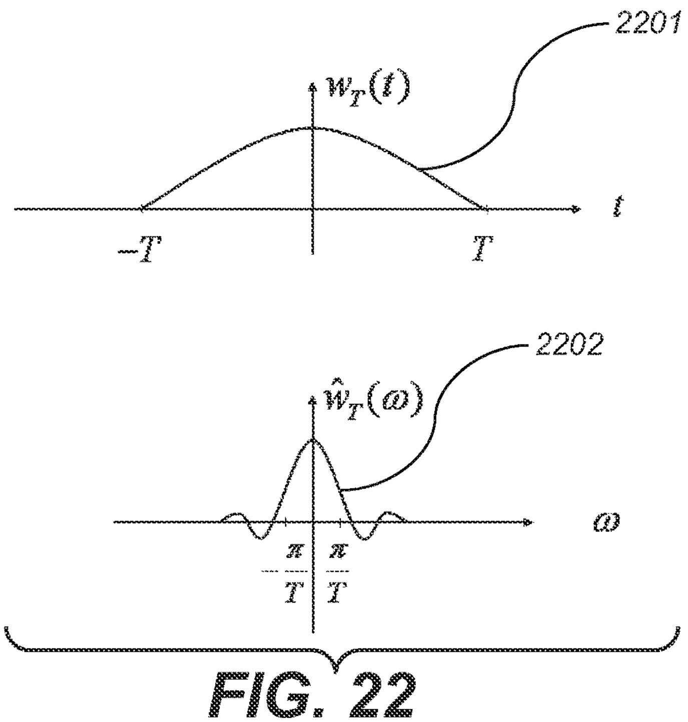
FIG. 22 illustrates the window function and its Fourier transform according to FIG. 20 used on the analysis side.

The synthesis subband signals $y_n(k)$ can also be determined as a result of the analysis filter bank 301 and the non-linear processing, i.e. harmonic transposer 302 illustrated in FIG. 3. On the analysis filter bank side, the analysis subband signals $x_n(k)$ may be represented as a function of the source signal z(t). For a transposition of order T, a complex modulated analysis filter bank with window $w_T(t)=w(t/T)/T$, a stride one, and a modulation frequency step, which is T times finer than the frequency step of the synthesis bank, is applied on the source signal z(t). FIG. 22 illustrates the appearance of the scaled window $w_T$ 2201 and its Fourier transform $\hat{w}_T$ 2202. Compared to FIG. 20, the time window 2201 is stretched out and the frequency window 2202 is compressed.

The analysis by the modified filter bank gives rise to the analysis subband signals $x_n(k)$:

$$x_n(k) = \int_{-\infty}^{\infty} z(t)w_T(t-k)\exp\left[-i\frac{n\pi}{T}(t-k)\right]dt \tag{5}$$

For a sinusoid, z(t)=Bcos(ξt+φ)=Re{Dexp(iξt)}, one finds that the subband signals of (5) for sufficiently large n with good approximation are given by $$x_n(k)=D\exp(ik\xi)\hat{w}(n\pi-T\xi). \tag{6}$$

Hence, submitting these subband signals to the harmonic transposer 302 and applying the direct transposition rule (1) to (6) yields $$\tilde{y}_n(k) = gD\left(\frac{D}{|D|}\right)^{T-1}\left(\frac{\hat{w}(n\pi-T\xi)}{|\hat{w}(n\pi-T\xi)|}\right)^{T-1}\cdot\exp(ikT\xi)\hat{w}(n\pi-T\xi). \tag{7}$$

The synthesis subband signals $y_n(k)$ given by formula (4) and the nonlinear subband signals obtained through harmonic transposition $\tilde{y}_n(k)$ given by formal (7) ideally should match.

For odd transposition orders T, the factor containing the influence of the window in (7) is equal to one, since the Fourier transform of the window is real valued by assumption, and T-1 is an even number. Therefore, formula (7) can be matched exactly to formula (4) with ω=Tξ, for all subbands, such that the output of the synthesis filter bank with input subband signals according to formula (7) is a sinusoid with a frequency ω=Tξ, amplitude A=gB, and phase θ=Tφ, wherein B and φ are determined from the formula: D=Bexp(iφ), which upon insertion yields $$gD\left(\frac{D}{|D|}\right)^{T-1} = gB\exp(iT\varphi).$$

Hence, a harmonic transposition of order T of the sinusoidal source signal z(t) is obtained.

For even T, the match is more approximate, but it still holds on the positive valued part of the window frequency response ŵ, which for a symmetric real valued window includes the most important main lobe. This means that also for even values of T a harmonic transposition of the sinusoidal source signal z(t) is obtained. In the particular case of a Gaussian window, ŵ is always positive and consequently, there is no difference in performance for even and odd orders of transposition.

Similarly to formula (6), the analysis of a sinusoid with frequency ξ+Ω, i.e. the sinusoidal source signal z(t)=B' cos((ξ+Ω)t+φ')=Re{E exp(i(ξ+Ω)t)}, is $$x'_n(k)=E\exp(ik(\xi+\Omega))\hat{w}(n\pi-T(\xi+\Omega)). \tag{8}$$

Therefore, feeding the two subband signals $u_1=x_{n-p_1}(k)$, which corresponds to the signal 801 in FIG. 8, and $u_2=x_{n-p_2}(k)$, which corresponds to the signal 802 in FIG. 8, into the cross product processing 800-*n* illustrated in FIG. 8 and applying the cross product formula (2) yields the output subband signal 803

$$\tilde{y}_n(k) = g\exp[ik(T\xi + r\Omega)]M(n, \xi), \tag{9}$$

where $$M(n, \xi) = \frac{D^{T-r}E^r}{|D^{T-r}E^r|^{1-1/T}} \frac{\hat{w}((n-p_1)\pi - T\xi)^{T-r}\hat{w}((n+p_2)\pi - T(\xi+\Omega))^r}{|\hat{w}((n-p_1)\pi - T\xi)^{T-r}\hat{w}((n+p_2)\pi - T(\xi+\Omega))^r|^{1-1/T}}. \tag{10}$$

From formula (9) it can be seen that the phase evolution of the output subband signal 803 of the MISO system 800-*n* follows the phase evolution of an analysis of a sinusoid of frequency $T\xi+r\Omega$. This holds independently of the choice of the index shifts $p_1$ and $p_2$. In fact, if the subband signal (9) is fed into a subband channel n corresponding to the frequency $T\xi+r\Omega$, that is if $n\pi\approx T\xi+r\Omega$, then the output will be a contribution to the generation of a sinusoid at frequency $T\xi+r\Omega$. However, it is advantageous to make sure that each contribution is significant, and that the contributions add up in a beneficial fashion. These aspects will be discussed below.

Given a cross product enhancement pitch parameter $\Omega$, suitable choices for index shifts $p_1$ and $p_2$ can be derived in order for the complex magnitude $M(n,\xi)$ of (10) to approximate $\hat{w}(n\pi-(T\xi+r\Omega))$ for a range of subbands n, in which case the final output will approximate a sinusoid at the frequency $T\xi+r\Omega$. A first consideration on main lobes imposes all three values of $(n-p_1)\pi-T\xi$, $(n+p_2)\pi-T(\xi+\Omega)$, $n\pi-(T\xi+r\Omega)$ to be small simultaneously, which leads to the approximate equalities $$p_1 \approx r\frac{\Omega}{\pi} \text{ and } p_2 \approx (T-r)\frac{\Omega}{\pi}. \tag{11}$$

This means that when knowing the cross product enhancement pitch parameter $\Omega$, the index shifts may be approximated by formula (11), thereby allowing a simple selection of the analysis subbands. A more thorough analysis of the effects of the choice of the index shifts $p_1$ and $p_2$ according to formula (11) on the magnitude of the parameter $M(n,\xi)$ according to formula (10) can be performed for important special cases of window functions w(t) such as the Gaussian window and a sine window. One finds that the desired approximation to $\hat{w}(n\pi-(T\xi+r\Omega))$ is very good for several subbands with $n\pi\approx T\xi+r\Omega$.

It should be noted that the relation (11) is calibrated to the exemplary situation where the analysis filter bank 301 has an angular frequency subband spacing of $\pi/T$. In the general case, the resulting interpretation of (11) is that the cross term source span $p_1+p_2$ is an integer approximating the underlying fundamental frequency $\Omega$, measured in units of the analysis filter bank subband spacing, and that the pair $(p_1, p_2)$ is chosen as a multiple of (r,T−r).

For the determination of the index shift pair $(p_1, p_2)$ in the decoder the following modes may be used:

1. A value of $\Omega$ may be derived in the encoding process and explicitly transmitted to the decoder in a sufficient precision to derive the integer values of $p_1$ and $p_2$ by means of a suitable rounding procedure, which may follow the principles that
   $p_1+p_2$ approximates $\Omega/\Delta\omega$, where $\Delta\omega$ is the angular frequency spacing of the analysis filter bank; and
   $p_1/p_2$ is chosen to approximate r/(T−r).
2. For each target subband sample, the index shift pair $(p_1, p_2)$ may be derived in the decoder from a pre-determined list of candidate values such as $(p_1, p_2)$ $(rl,(T-r)l), l\in L, r\in\{1,2, \ldots, T-1\}$, where L is a list of positive integers. The selection may be based on an optimization of cross term output magnitude, e.g. a maximization of the energy of the cross term output.
3. For each target subband sample, the index shift pair $(p_1, p_2)$ may be derived from a reduced list of candidate values by an optimization of cross term output magnitude, where the reduced list of candidate values is derived in the encoding process and transmitted to the decoder.

It should be noted that phase modification of the subband signals $u_1$ and $u_2$ is performed with a weighting (T-r) and r, respectively, but the subband index distance $p_1$ and $p_2$ are chosen proportional to r and (T-r), respectively. Thus the closest subband to the synthesis subband n receives the strongest phase modification.

An advantageous method for the optimization procedure for the modes 2 and 3 outlined above may be to consider the Max-Min optimization:

$$\max\{\min\{|x_{n-p_1}(k)|,|x_{n+p_2}(k)|\}:(p_1,p_2)=(rl,(T-r)l), l\in L, r\in\{1,2, \ldots ,T-1\}\} \tag{12}$$

and to use the winning pair together with its corresponding value of r to construct the cross product contribution for a given target subband index n. In the decoder search oriented modes 2 and partially also 3, the addition of cross terms for different values r is preferably done independently, since there may be a risk of adding content to the same subband several times. If, on the other hand, the fundamental frequency $\Omega$ is used for selecting the subbands as in mode 1 or if only a narrow range of subband index distances are permitted as may be the case in mode 2, this particular issue of adding content to the same subband several times may be avoided.

Furthermore, it should also be noted that for the embodiments of the cross term processing schemes outlined above an additional decoder modification of the cross product gain g may be beneficial. For instance, it is referred to the input subband signals $u_1$, $u_2$ to the cross products MISO unit given by formula (2) and the input subband signal x to the transposition SISO unit given by formula (1). If all three signals are to be fed to the same output synthesis subband as shown in FIG. 4, where the direct processing 401 and the cross product processing 402 provide components for the same output synthesis subband, it may be desirable to set the cross product gain g to zero, i.e. the gain unit 902 of FIG. 9, if $$\min(|u_1|,|u_2|)<q|x|, \tag{13}$$

for a pre-defined threshold q>1. In other words, the cross product addition is only performed if the direct term input subband magnitude |x| is small compared to both of the cross product input terms. In this context, x is the analysis subband sample for the direct term processing which leads to an output at the same synthesis subband as the cross product under consideration. This may be a precaution in order to not enhance further a harmonic component that has already been furnished by the direct transposition.

Figure 10:
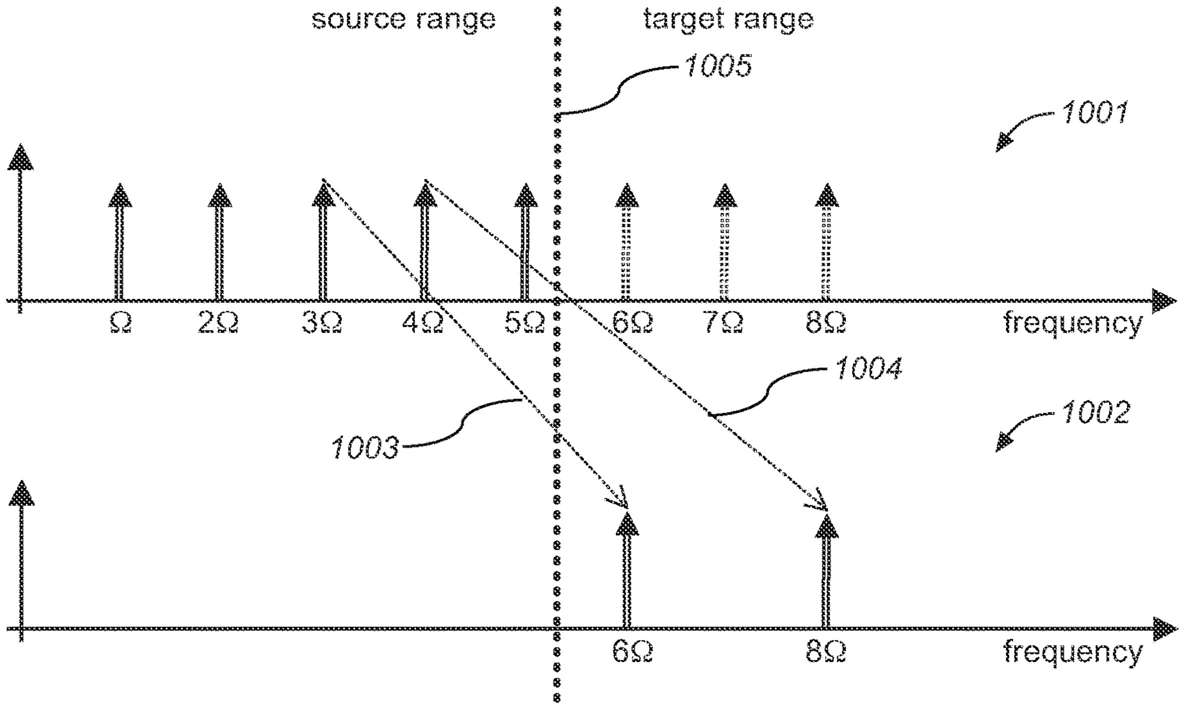
FIGS. 10-18 illustrate the effect of the invention for the harmonic transposition of exemplary periodic signals.

In the following, the harmonic transposition method outlined in the present document will be described for exemplary spectral configurations to illustrate the enhancements over the prior art. FIG. 10 illustrates the effect of direct harmonic transposition of order T=2. The top diagram 1001 depicts the partial frequency components of the original signal by vertical arrows positioned at multiples of the fundamental frequency Ω. It illustrates the source signal, e.g. at the encoder side. The diagram 1001 is segmented into a left sided source frequency range with the partial frequencies Ω,2Ω,3 Ω,4Ω,5Ω and a right sided target frequency range with partial frequencies 6Ω,7Ω,8Ω. The source frequency range will typically be encoded and transmitted to the decoder. On the other hand, the right sided target frequency range, which comprises the partials 6Ω,7Ω,8Ω above the cross over frequency 1005 of the HFR method, will typically not be transmitted to the decoder. It is an object of the harmonic transposition method to reconstruct the target frequency range above the cross-over frequency 1005 of the source signal from the source frequency range. Consequently, the target frequency range, and notably the partials 6Ω,7Ω,8Ω in diagram 1001 are not available as input to the transposer.

As outlined above, it is the aim of the harmonic transposition method to regenerate the signal components 6Ω,7Ω, 8Ω of the source signal from frequency components available in the source frequency range. The bottom diagram 1002 shows the output of the transposer in the right sided target frequency range. Such transposer may e.g. be placed at the decoder side. The partials at frequencies 6Ω and 8Ω are regenerated from the partials at frequencies 3Ω and 4Ω by harmonic transposition using an order of transposition T=2. As a result of a spectral stretching effect of the harmonic transposition, depicted here by the dotted arrows 1003 and 1004, the target partial at 7Ω is missing. This target partial at 7Ω can not be generated using the underlying prior art harmonic transposition method.

Figure 11:
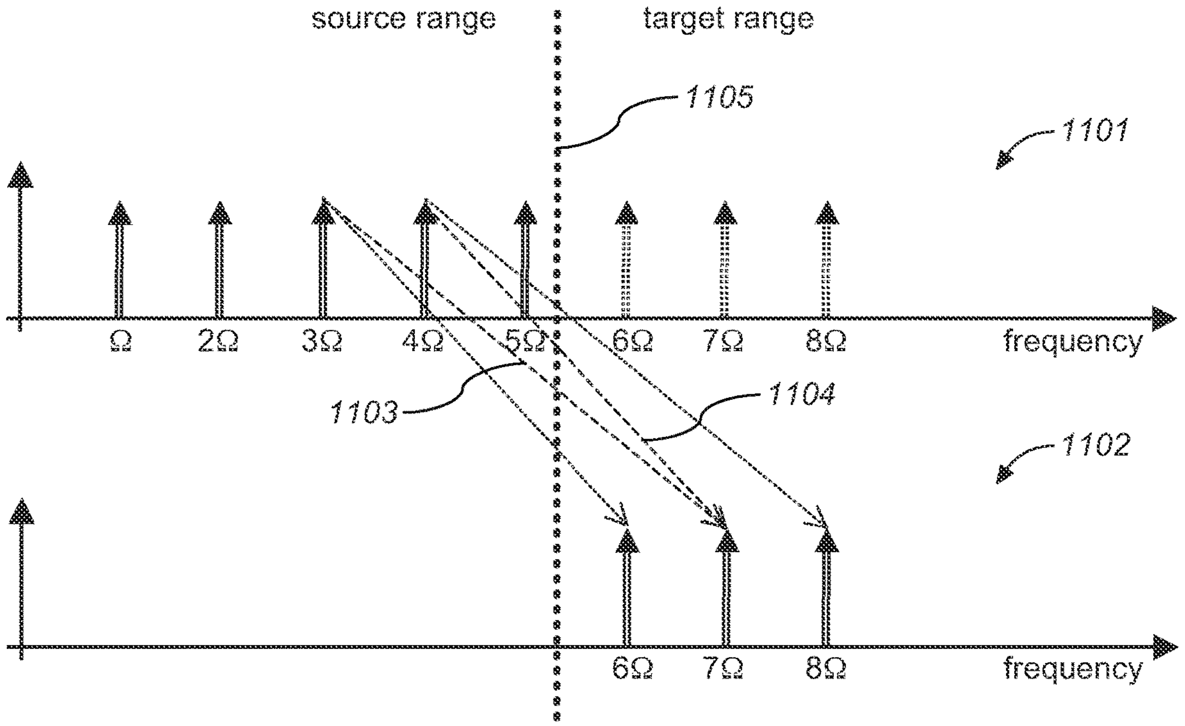

FIG. 11 illustrates the effect of the invention for harmonic transposition of a periodic signal in the case where a second order harmonic transposer is enhanced by a single cross term, i.e. T=2 and r=1. As outlined in the context of FIG. 10, a transposer is used to generate the partials 6Ω,7Ω,8Ω in the target frequency range above the cross-over frequency 1105 in the lower diagram 1102 from the partials Ω,2Ω,3Ω,4Ω, 5Ω in the source frequency range below the cross-over frequency 1105 of diagram 1101. In addition to the prior art transposer output of FIG. 10, the partial frequency component at 7Ω is regenerated from a combination of the source partials at 3Ω and 4Ω. The effect of the cross product addition is depicted by dashed arrows 1103 and 1104. In terms of formulas, one has ω=3Ω and therefore (T−r)ω+r(ω+Ω)=Tω+rΩ=6Ω+Ω=7Ω. As can be seen from this example, all the target partials may be regenerated using the inventive HFR method outlined in the present document.

Figure 12:
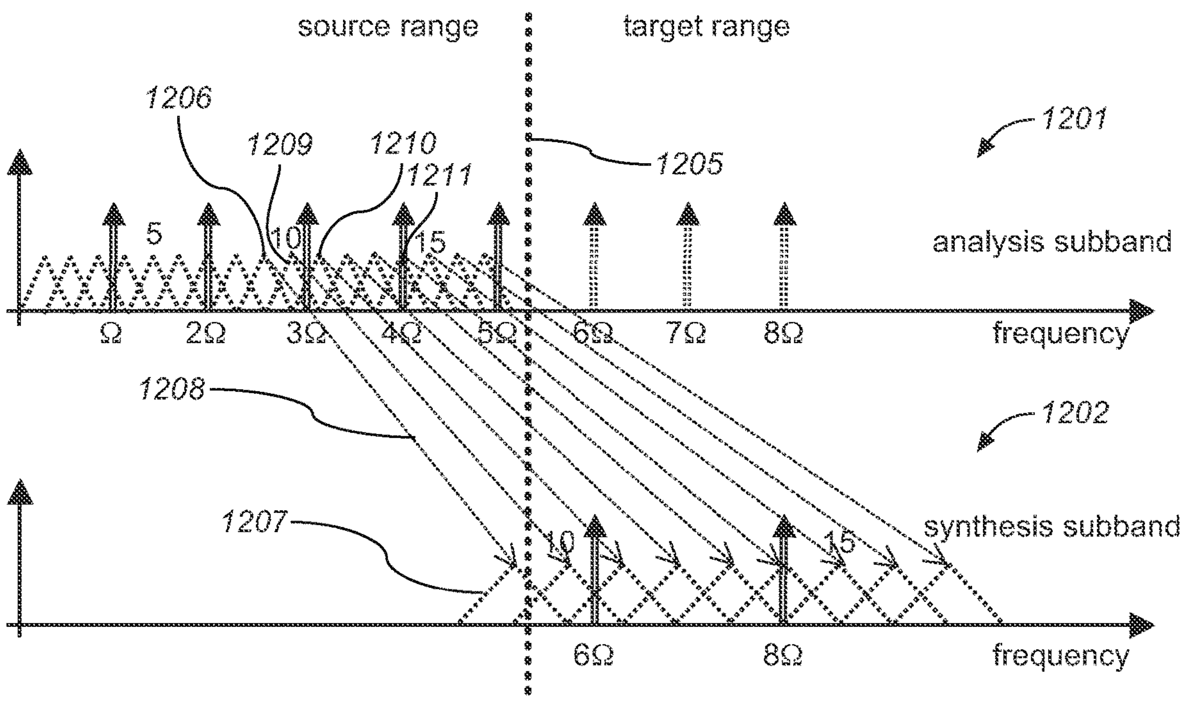

FIG. 12 illustrates a possible implementation of a prior art second order harmonic transposer in a modulated filter bank for the spectral configuration of FIG. 10. The stylized frequency responses of the analysis filter bank subbands are shown by dotted lines, e.g. reference sign 1206, in the top diagram 1201. The subbands are enumerated by the subband index, of which the indexes 5, 10 and 15 are shown in FIG. 12. For the given example, the fundamental frequency Ω is equal to 3.5 times the analysis subband frequency spacing. This is illustrated by the fact that the partial Ω in diagram 1201 is positioned between the two subbands with subband index 3 and 4. The partial 2Ω is positioned in the center of the subband with subband index 7 and so forth.

The bottom diagram 1202 shows the regenerated partials 6Ω and 8Ω superimposed with the stylized frequency responses, e.g. reference sign 1207, of selected synthesis filter bank subbands. As described earlier, these subbands have a T=2 times coarser frequency spacing. Correspondingly, also the frequency responses are scaled by the factor T=2. As outlined above, the prior art direct term processing method modifies the phase of each analysis subband, i.e. of each subband below the cross-over frequency 1205 in diagram 1201, by a factor T=2 and maps the result into the synthesis subband with the same index, i.e. a subband above the cross-over frequency 1205 in diagram 1202. This is symbolized in FIG. 12 by diagonal dotted arrows, e.g. arrow 1208 for the analysis subband 1206 and the synthesis subband 1207. The result of this direct term processing for subbands with subband indexes 9 to 16 from the analysis subband 1201 is the regeneration of the two target partials at frequencies 6Ω and 8Ω in the synthesis subband 1202 from the source partials at frequencies 3Ω and 4Ω. As can be seen from FIG. 12, the main contribution to the target partial 6Ω comes from the subbands with the subband indexes 10 and 11, i.e. reference signs 1209 and 1210, and the main contribution to the target partial 8Ω comes from the subband with subband index 14, i.e. reference sign 1211.

Figure 13:
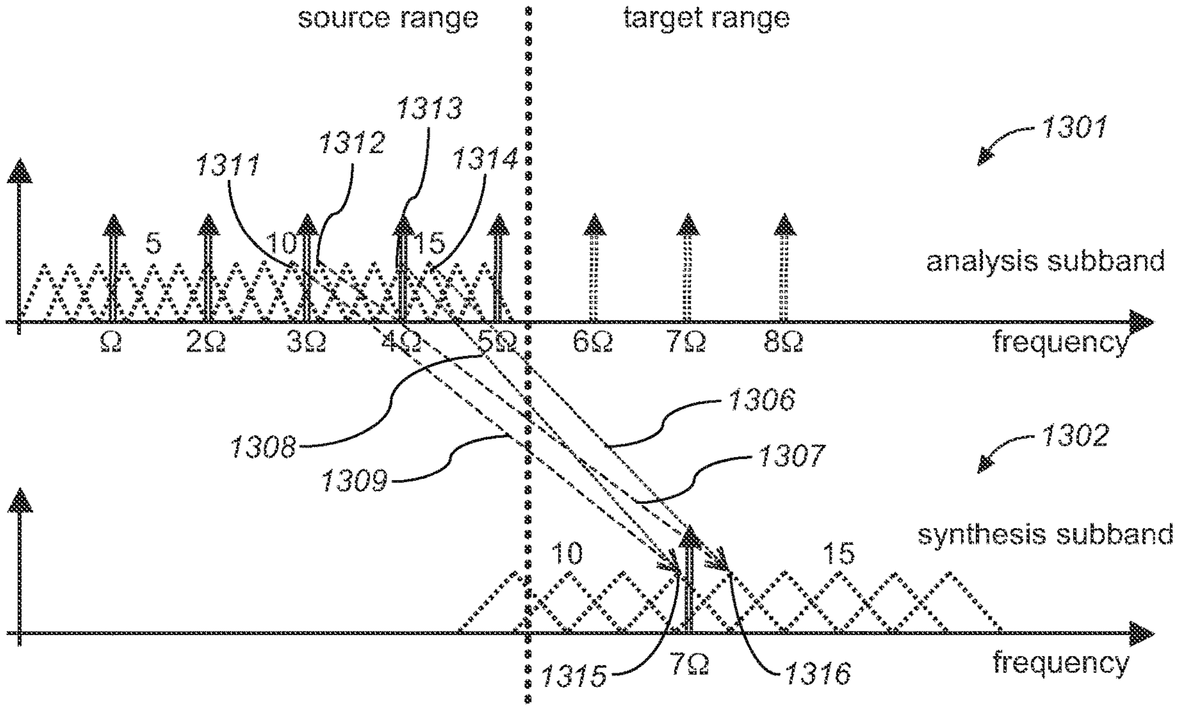

FIG. 13 illustrates a possible implementation of an additional cross term processing step in the modulated filter bank of FIG. 12. The cross-term processing step corresponds to the one described for periodic signals with the fundamental frequency Ω in relation to FIG. 11. The upper diagram 1301 illustrates the analysis subbands, of which the source frequency range is to be transposed into the target frequency range of the synthesis subbands in the lower diagram 1302. The particular case of the generation of the synthesis subbands 1315 and 1316, which are surrounding the partial 7Ω, from the analysis subbands is considered. For an order of transposition T=2, a possible value r=1 may be selected. Choosing the list of candidate values $(p_1, p_2)$ as a multiple of (r,T−r)=(1,1) such that $p_1+p_2$ approximates $$\frac{\Omega}{\Delta\omega} = \frac{\Omega}{(\Omega/3.5)} = 3.5, \text{ i.e.}$$

the fundamental frequency Ω in units of the analysis subband frequency spacing, leads to the choice $p_1=p_2=2$. As outlined in the context of FIG. 8, a synthesis subband with the subband index n may be generated from the cross-term product of the analysis subbands with the subband index $(n-p_1)$ and $(n+p_2)$. Consequently, for the synthesis subband with subband index 12, i.e. reference sign 1315, a cross product is formed from the analysis subbands with subband index $(n-p_1)=12-2=10$, i.e. reference sign 1311, and $(n+p_2)=12+2=14$, i.e. reference sign 1313. For the synthesis subband with subband index 13, a cross product is formed from analysis subbands with and index $(n-p_1)=13-2=11$, i.e. reference sign 1312, and $(n+p_2)=13+2=15$, i.e. reference sign 1314. This process of cross-product generation is symbolized by the diagonal dashed/dotted arrow pairs, i.e. reference sign pairs 1308, 1309 and 1306, 1307, respectively.

As can be seen from FIG. 13, the partial 7Ω is placed primarily within the subband 1315 with index 12 and only secondarily in the subband 1316 with index 13. Consequently, for more realistic filter responses, there will be more direct and/or cross terms around synthesis subband 1315 with index 12 which add beneficially to the synthesis of a high quality sinusoid at frequency (T−r)ω+r(ω+Ω)=Tω+

$r\Omega=6\Omega+\Omega=7\Omega$ than terms around synthesis subband 1316 with index 13. Furthermore, as highlighted in the context of formula (13), a blind addition of all cross terms with $p_1=p_2=2$ could lead to unwanted signal components for less periodic and academic input signals. Consequently, this phenomenon of unwanted signal components may require the application of an adaptive cross product cancellation rule such as the rule given by formula (13).

Figure 14:
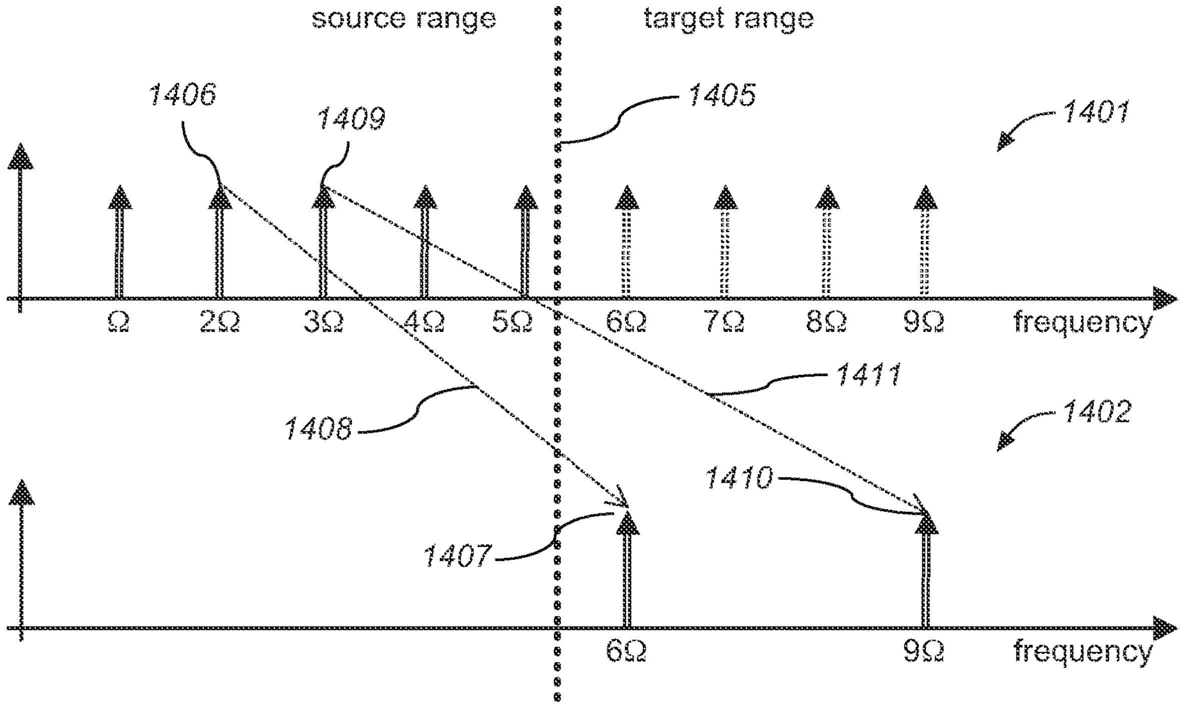

FIG. 14 illustrates the effect of prior art harmonic transposition of order T=3. The top diagram 1401 depicts the partial frequency components of the original signal by vertical arrows positioned at multiples of the fundamental frequency Ω. The partials 6Ω,7Ω,8Ω,9Ω are in the target range above the cross over frequency 1405 of the HFR method and therefore not available as input to the transposer. The aim of the harmonic transposition is to regenerate those signal components from the signal in the source range. The bottom diagram 1402 shows the output of the transposer in the target frequency range. The partials at frequencies 6Ω, i.e. reference sign 1407, and 9Ω, i.e. reference sign 1410, have been regenerated from the partials at frequencies 2Ω, i.e. reference sign 1406, and 3Ω, i.e. reference sign 1409. As a result of a spectral stretching effect of the harmonic transposition, depicted here by the dotted arrows 1408 and 1411, respectively, the target partials at 7Ω and 8Ω are missing.

Figure 15:
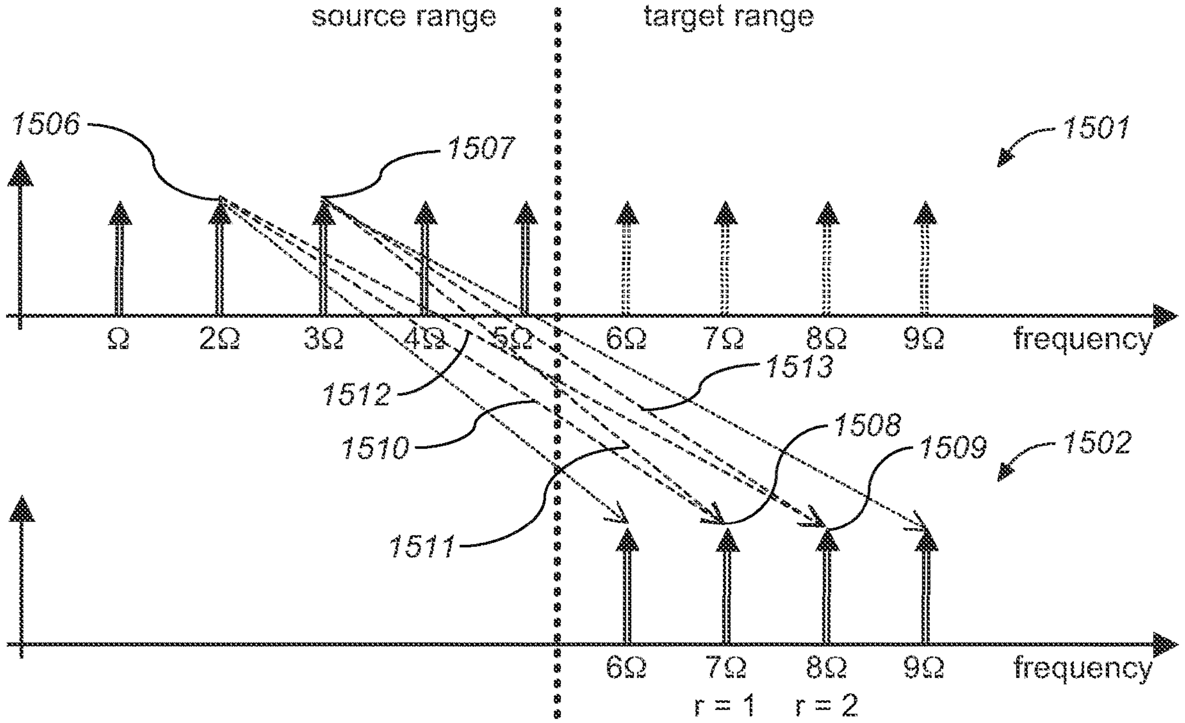

FIG. 15 illustrates the effect of the invention for the harmonic transposition of a periodic signal in the case where a third order harmonic transposer is enhanced by the addition of two different cross terms, i.e. T=3 and r=1,2. In addition to the prior art transposer output of FIG. 14, the partial frequency component 1508 at 7Ω is regenerated by the cross term for r=1 from a combination of the source partials 1506 at 2Ω and 1507 at 3Ω. The effect of the cross product addition is depicted by the dashed arrows 1510 and 1511. In terms of formulas, one has with $\omega=2\Omega$, $(T-r)\omega+r(\omega+\Omega)=T\omega+r\Omega=6\Omega+\Omega=7\Omega$. Likewise, the partial frequency component 1509 at 8M is regenerated by the cross term for r=2. This partial frequency component 1509 in the target range of the lower diagram 1502 is generated from the partial frequency components 1506 at 2Ω and 1507 at 3Ω in the source frequency range of the upper diagram 1501. The generation of the cross term product is depicted by the arrows 1512 and 1513. In terms of formulas, one has $(T-r)\omega+r(\omega+\Omega)=T\omega+r\Omega=6\Omega+2\Omega=8\Omega$. As can be seen, all the target partials may be regenerated using the inventive HFR method described in the present document.

Figure 16:
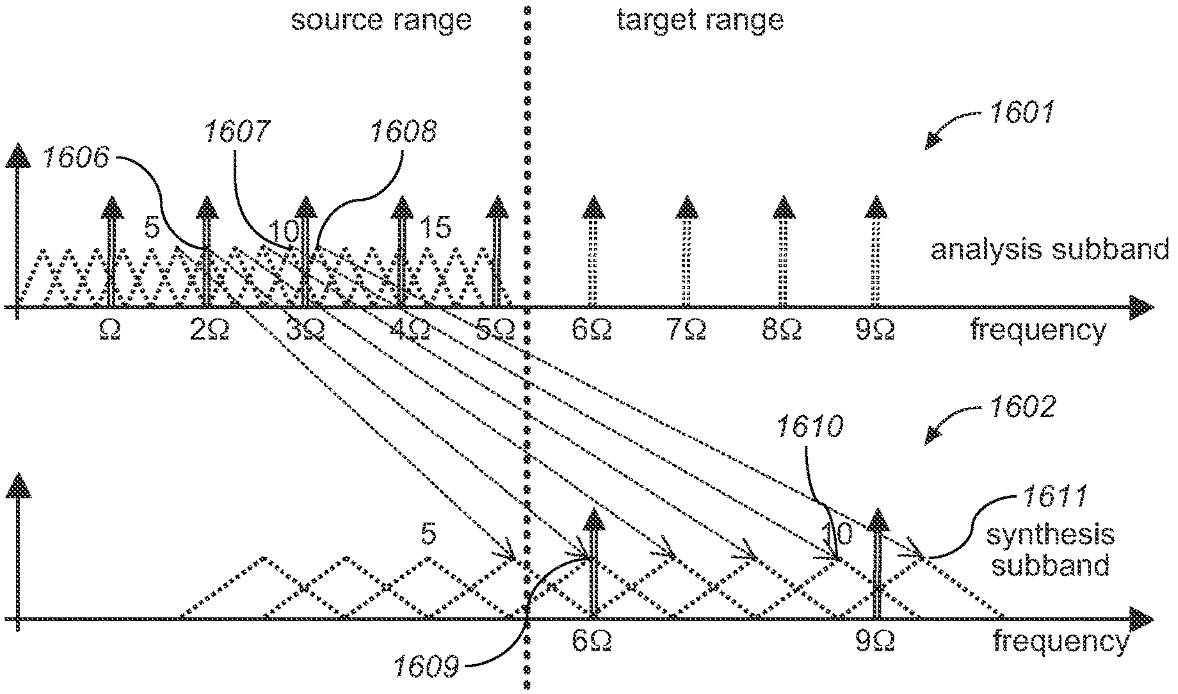

FIG. 16 illustrates a possible implementation of a prior art third order harmonic transposer in a modulated filter bank for the spectral situation of FIG. 14. The stylized frequency responses of the analysis filter bank subbands are shown by dotted lines in the top diagram 1601. The subbands are enumerated by the subband indexes 1 through 17 of which the subbands 1606, with index 7, 1607, with index 10 and 1608, with index 11, are referenced in an exemplary manner. For the given example, the fundamental frequency Ω is equal to 3.5 times the analysis subband frequency spacing Δω. The bottom diagram 1602 shows the regenerated partial frequency superimposed with the stylized frequency responses of selected synthesis filter bank subbands. By way of example, the subbands 1609, with subband index 7, 1610, with subband index 10 and 1611, with subband index 11 are referenced. As described above, these subbands have a T=3 times coarser frequency spacing Δω. Correspondingly, also the frequency responses are scaled accordingly.

The prior art direct term processing modifies the phase of the subband signals by a factor T=3 for each analysis subband and maps the result into the synthesis subband with the same index, as symbolized by the diagonal dotted arrows. The result of this direct term processing for subbands 6 to 11 is the regeneration of the two target partial frequencies 6Ω and 9Ω from the source partials at frequencies 2Ω and 3Ω. As can be seen from FIG. 16, the main contribution to the target partial 6Ω comes from subband with index 7, i.e. reference sign 1606, and the main contributions to the target partial 9Ω comes from subbands with index 10 and 11, i.e. reference signs 1607 and 1608, respectively.

Figure 17:
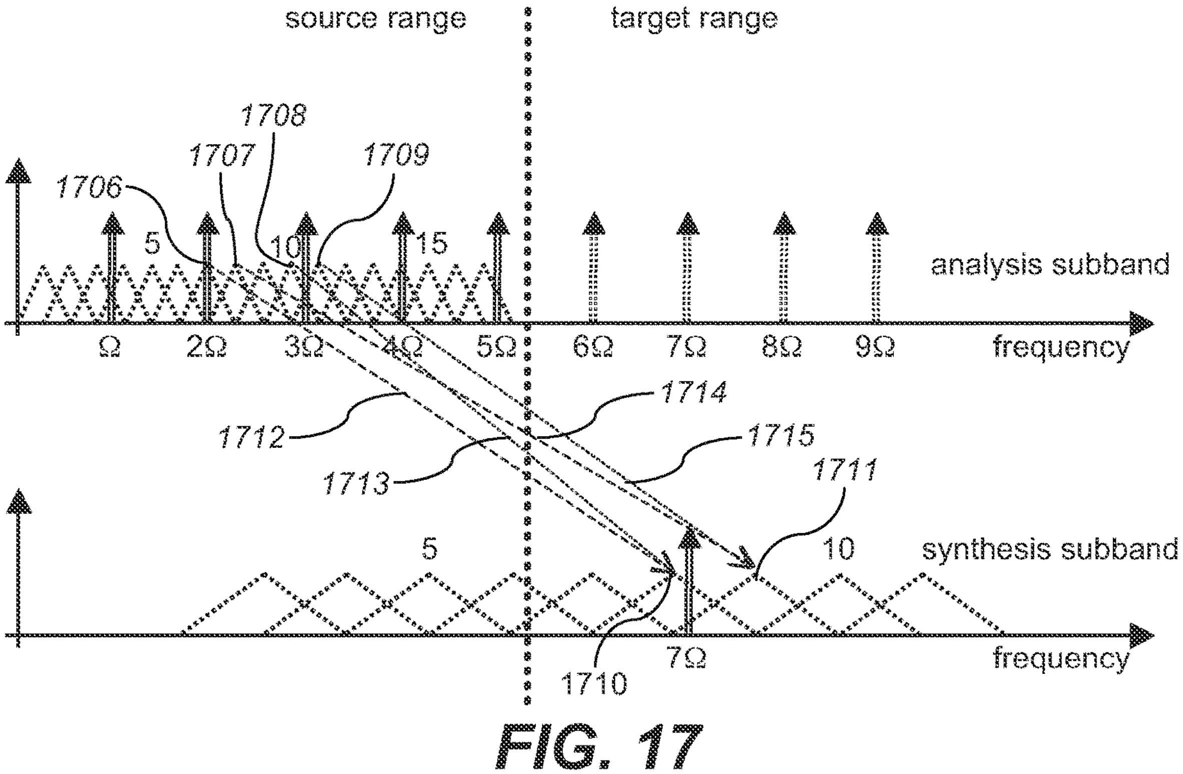

FIG. 17 illustrates a possible implementation of an additional cross term processing step for r=1 in the modulated filter bank of FIG. 16 which leads to the regeneration of the partial at 7Ω. As was outlined in the context of FIG. 8 the index shifts $(p_1, p_2)$ may be selected as a multiple of $(r,T-r)=(1,2)$, such that $p_1+p_2$ approximates 3.5, i.e. the fundamental frequency Ω in units of the analysis subband frequency spacing Δω. In other words, the relative distance, i.e. the distance on the frequency axis divided by the analysis subband frequency spacing Δω, between the two analysis subbands contributing to the synthesis subband which is to be generated, should best approximate the relative fundamental frequency, i.e. the fundamental frequency Ω divided by the analysis subband frequency spacing Δω). This is also expressed by formulas (11) and leads to the choice $p_1=1$, $p_2=2$.

As shown in FIG. 17, the synthesis subband with index 8, i.e. reference sign 1710, is obtained from a cross product formed from the analysis subbands with index $(n-p_1)=8-1=7$, i.e. reference sign 1706, and $(n+p_2)=8+2=10$, i.e. reference sign 1708. For the synthesis subband with index 9, a cross product is formed from analysis subbands with index $(n-p_1)=9-1=8$, i.e. reference sign 1707, and $(n+p_2)=9+2=11$, i.e. reference sign 1709. This process of forming cross products is symbolized by the diagonal dashed/dotted arrow pairs, i.e. arrow pair 1712, 1713 and 1714, 1715, respectively. It can be seen from FIG. 17 that the partial frequency 7Ω is positioned more prominently in subband 1710 than in subband 1711. Consequently, it is to be expected that for realistic filter responses, there will be more cross terms around synthesis subband with index 8, i.e. subband 1710, which add beneficially to the synthesis of a high quality sinusoid at frequency $(T-r)\omega+r(\omega+\Omega)=T\omega+r\Omega=6\Omega+\Omega=7\Omega$.

Figure 18:
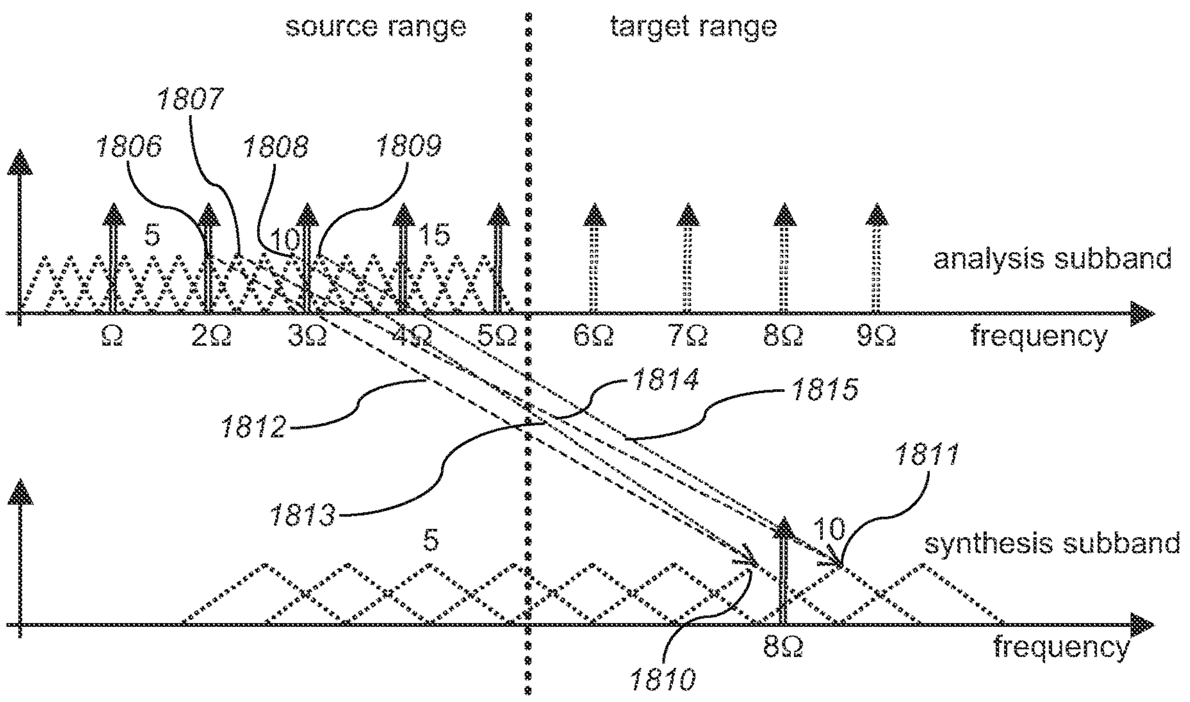

FIG. 18 illustrates a possible implementation of an additional cross term processing step for r=2 in the modulated filterbank of FIG. 16 which leads to the regeneration of the partial frequency at 8Ω. The index shifts $(p_1, p_2)$ may be selected as a multiple of $(r,T-r)=(2,1)$, such that $p_1+p_2$ approximates 3.5, i.e. the fundamental frequency Ω in units of the analysis subband frequency spacing Δω. This leads to the choice $p_1=2$ 2, $p_2=1$. As shown in FIG. 18, the synthesis subband with index 9, i.e. reference sign 1810, is obtained from a cross product formed from the analysis subbands with index $(n-p_1)=9-2=7$, i.e. reference sign 1806, and $(n+p_2)=9+1=10$, i.e. reference sign 1808. For the synthesis subband with index 10, a cross product is formed from analysis subbands with index $(n-p_1)=10-2=8$, i.e. reference sign 1807, and $(n+p_2)=10+1=11$, i.e. reference sign 1809. This process of forming cross products is symbolized by the diagonal dashed/dotted arrow pairs, i.e. arrow pair 1812, 1813 and 1814, 1815, respectively. It can be seen from FIG. 18 that the partial frequency 8Ω is positioned slightly more prominently in subband 1810 than in subband 1811. Consequently, it is to be expected that for realistic filter responses, there will be more direct and/or cross terms around synthesis subband with index 9, i.e. subband 1810, which add beneficially to the synthesis of a high quality sinusoid at frequency $(T-r)\omega+r(\omega+\Omega)=T\omega+r\Omega=2\Omega+6\Omega=8\Omega$.

In the following, reference is made to FIGS. 23 and 24 which illustrate the Max-Min optimization based selection procedure (12) for the index shift pair $(p_1, p_2)$ and r according to this rule for T=3. The chosen target subband index is n=18 and the top diagram furnishes an example of the magnitude of a subband signal for a given time index. The list of positive integers is given here by the seven values L={2,3, . . . , 8}.

Figure 23:
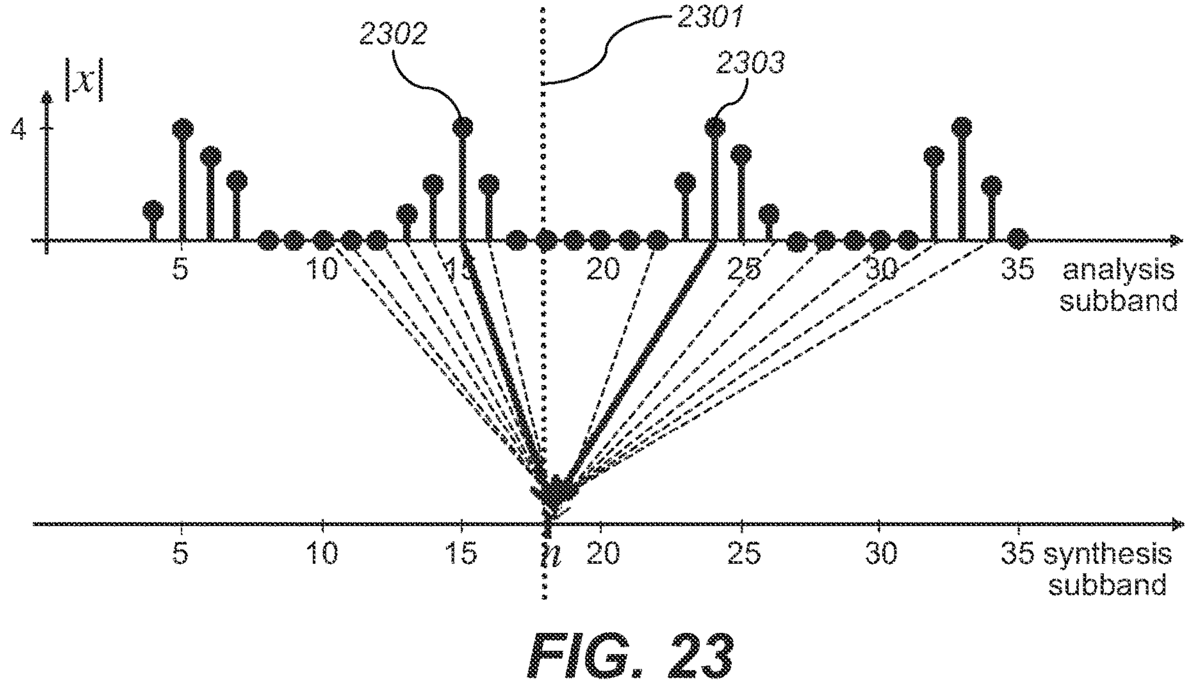
FIGS. 23 and 24 illustrate the determination of appropriate analysis filter bank subbands for the cross-term enhancement of a synthesis filter band subband.

FIG. 23 illustrates the search for candidates with r=1. The target or synthesis subband is shown with the index n=18. The dotted line 2301 highlights the subband with the index n=18 in the upper analysis subband range and the lower synthesis subband range. The possible index shift pairs are $(p_1, p_2)$={(2,4),(3,6), . . . , (8,16)}, for l=2, 3, . . . , 8, respectively, and the corresponding analysis subband magnitude sample index pairs, i.e. the list of subband index pairs that are considered for determining the optimal cross term, are {(16,22),(15,24), . . . , (10,34)}.

The set of arrows illustrate the pairs under consideration. As an example, the pair (15,24) denoted by the reference signs 2302 and 2303 is shown. Evaluating the minimum of these magnitude pairs gives the list (0,4,1,0,0,0,0) of respective minimum magnitudes for the possible list of cross terms. Since the second entry for l=3 is maximal, the pair (15,24) wins among the candidates with r=1, and this selection is depicted by the thick arrows.

Figure 24:
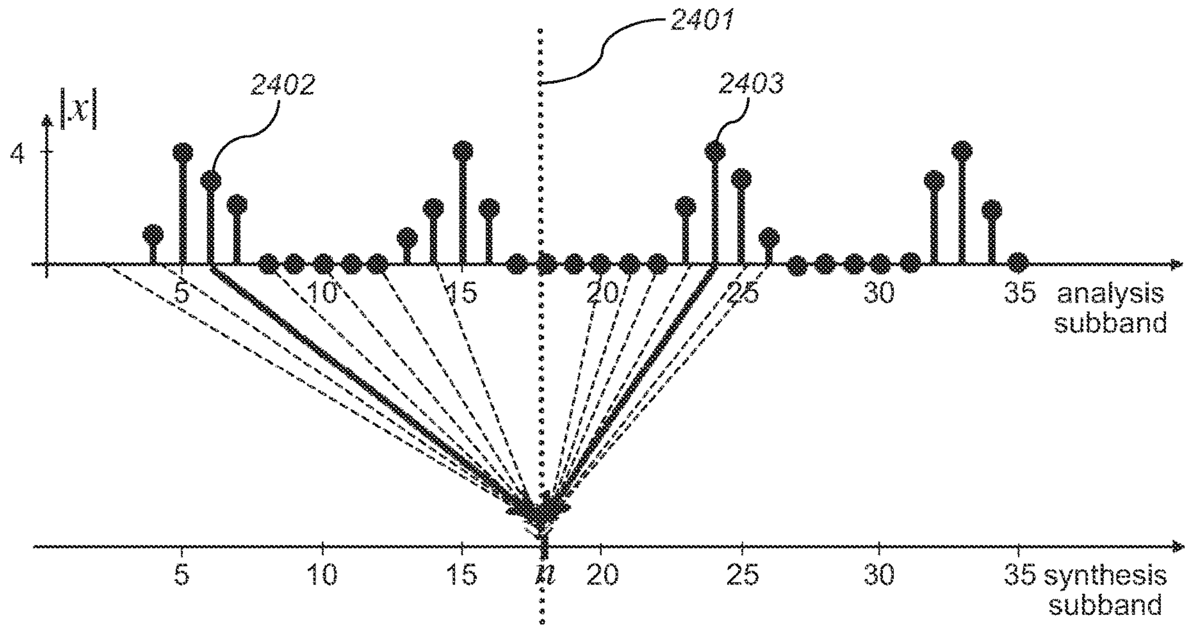

FIG. 24 similarly illustrates the search for candidates with r=2. The target or synthesis subband is shown with the index n=18. The dotted line 2401 highlights the subband with the index n=18 in the upper analysis subband range and the lower synthesis subband range. In this case, the possible index shift pairs are $(p_1, p_2)$={(4,2),(6,3), . . . ,(16,8)} and the corresponding analysis subband magnitude sample index pairs are {(14,20),(12,21), . . . ,(2,26)}, of which the pair (6,24) is represented by the reference signs 2402 and 2403. Evaluating the minimum of these magnitude pairs gives the list (0,0,0,0,3,1,0). Since the fifth entry is maximal, i.e. l=6, the pair (6,24) wins among the candidates with r=2, as depicted by the thick arrows. Overall, since the minimum of the corresponding magnitude pair is smaller than that of the selected subband pair for r=1, the final selection for target subband index n=18 falls on the pair (15,24) and r=1.

It should further more be noted that when the input signal z(t) is a harmonic series with a fundamental frequency Ω, i.e. with a fundamental frequency which corresponds to the cross product enhancement pitch parameter, and Q is sufficiently large compared to the frequency resolution of the analysis filter bank, the analysis subband signals $x_n(k)$ given by formula (6) and $x'_n(k)$ given by formula (8) are good approximations of the analysis of the input signal z(t) where the approximation is valid in different subband regions. It follows from a comparison of the formulas (6) and (8-10) that a harmonic phase evolution along the frequency axis of the input signal z(t) will be extrapolated correctly by the present invention. This holds in particular for a pure pulse train. For the output audio quality, this is an attractive feature for signals of pulse train like character, such as those produced by human voices and some musical instruments.

Figure 25:
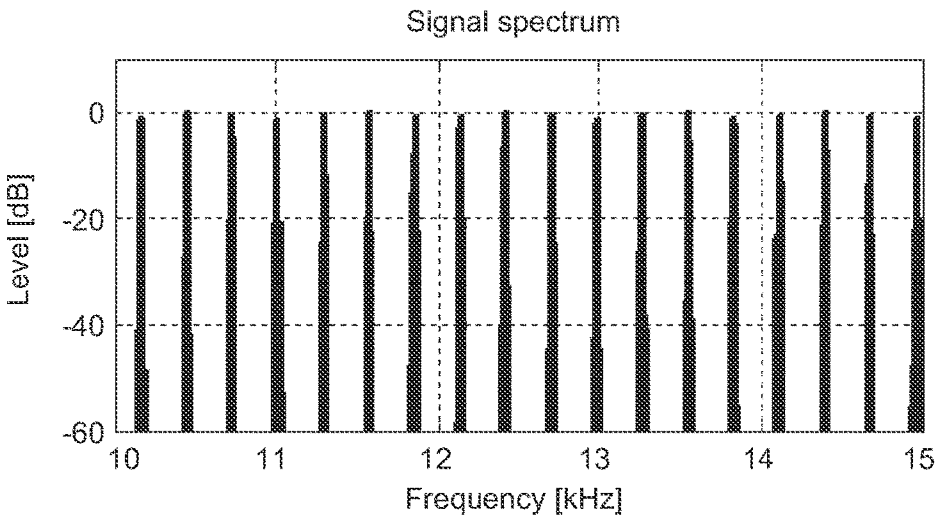
FIGS. 25, 26, and 27 illustrate experimental results of the described direct-term and cross-term harmonic transposition method.
Figure 26:
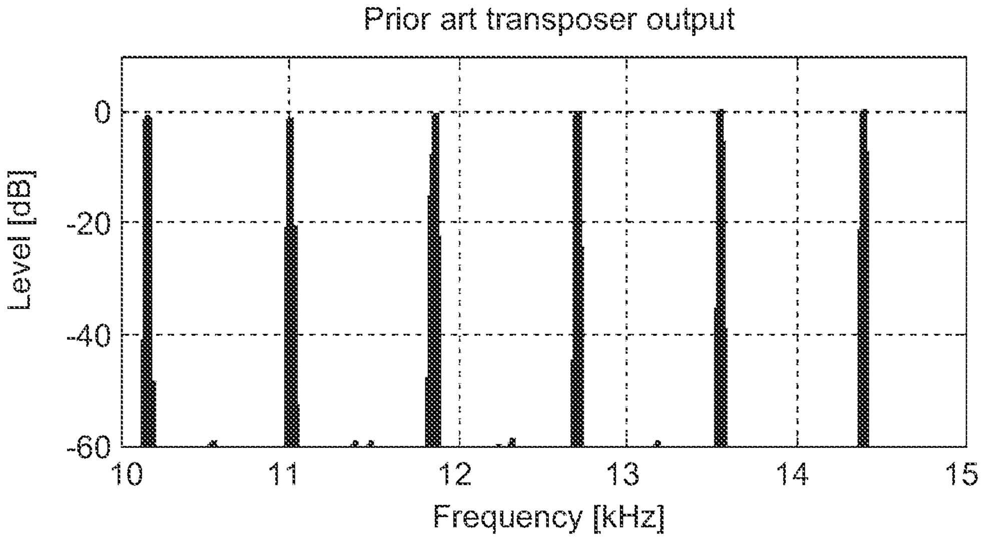
Figure 27:
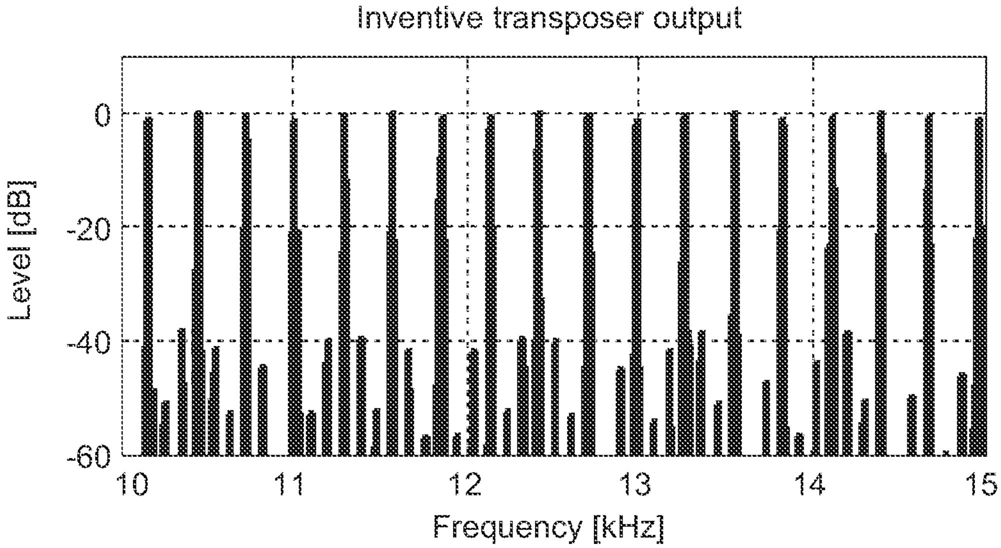

FIGS. 25, 26 and 27 illustrate the performance of an exemplary implementation of the inventive transposition for a harmonic signal in the case T=3. The signal has a fundamental frequency 282.35 Hz and its magnitude spectrum in the considered target range of 10 to 15 kHz is depicted in FIG. 25. A filter bank of N=512 subbands is used at a sampling frequency of 48 kHz to implement the transpositions. The magnitude spectrum of the output of a third order direct transposer (T=3) is depicted in FIG. 26. As can be seen, every third harmonic is reproduced with high fidelity as predicted by the theory outlined above, and the perceived pitch will be 847 Hz, three times the original one. FIG. 27 shows the output of a transposer applying cross term products. All harmonics have been recreated up to imperfections due to the approximative aspects of the theory. For this case, the side lobes are about 40 dB below the signal level and this is more than sufficient for regeneration of high frequency content which is perceptually indistinguishable from the original harmonic signal.

In the following, reference is made to FIG. 28 and FIG. 29 which illustrate an exemplary encoder 2800 and an exemplary decoder 2900, respectively, for unified speech and audio coding (USAC). The general structure of the USAC encoder 2800 and decoder 2900 is described as follows: First there may be a common pre/postprocessing consisting of an MPEG Surround (MPEGS) functional unit to handle stereo or multi-channel processing and an enhanced SBR (eSBR) unit 2801 and 2901, respectively, which handles the parametric representation of the higher audio frequencies in the input signal and which may make use of the harmonic transposition methods outlined in the present document. Then there are two branches, one consisting of a modified Advanced Audio Coding (AAC) tool path and the other consisting of a linear prediction coding (LP or LPC domain) based path, which in turn features either a frequency domain representation or a time domain representation of the LPC residual. All transmitted spectra for both, AAC and LPC, may be represented in MDCT domain following quantization and arithmetic coding. The time domain representation uses an ACELP excitation coding scheme.

The enhanced Spectral Band Replication (eSBR) unit 2801 of the encoder 2800 may comprise the high frequency reconstruction systems outlined in the present document. In particular, the eSBR unit 2801 may comprise an analysis filter bank 301 in order to generate a plurality of analysis subband signals. This analysis subband signals may then be transposed in a non-linear processing unit 302 to generate a plurality of synthesis subband signals, which may then be inputted to a synthsis filter bank 303 in order to generate a high frequency component. In the eSBR unit 2801, on the encoding side, a set of information may be determined on how to generate a high frequency component from the low frequency component which best matches the high frequency component of the original signal. This set of information may comprise information on signal characteristics, such as a predominant fundamental frequency Ω, on the spectral envelope of the high frequency component, and it may comprise information on how to best combine analysis subband signals, i.e. information such as a limited set of index shift pairs $(p_1,p_2)$. Encoded data related to this set of information is merged with the other encoded information in a bitstream multiplexer and forwarded as an encoded audio stream to a corresponding decoder 2900.

Figure 29:
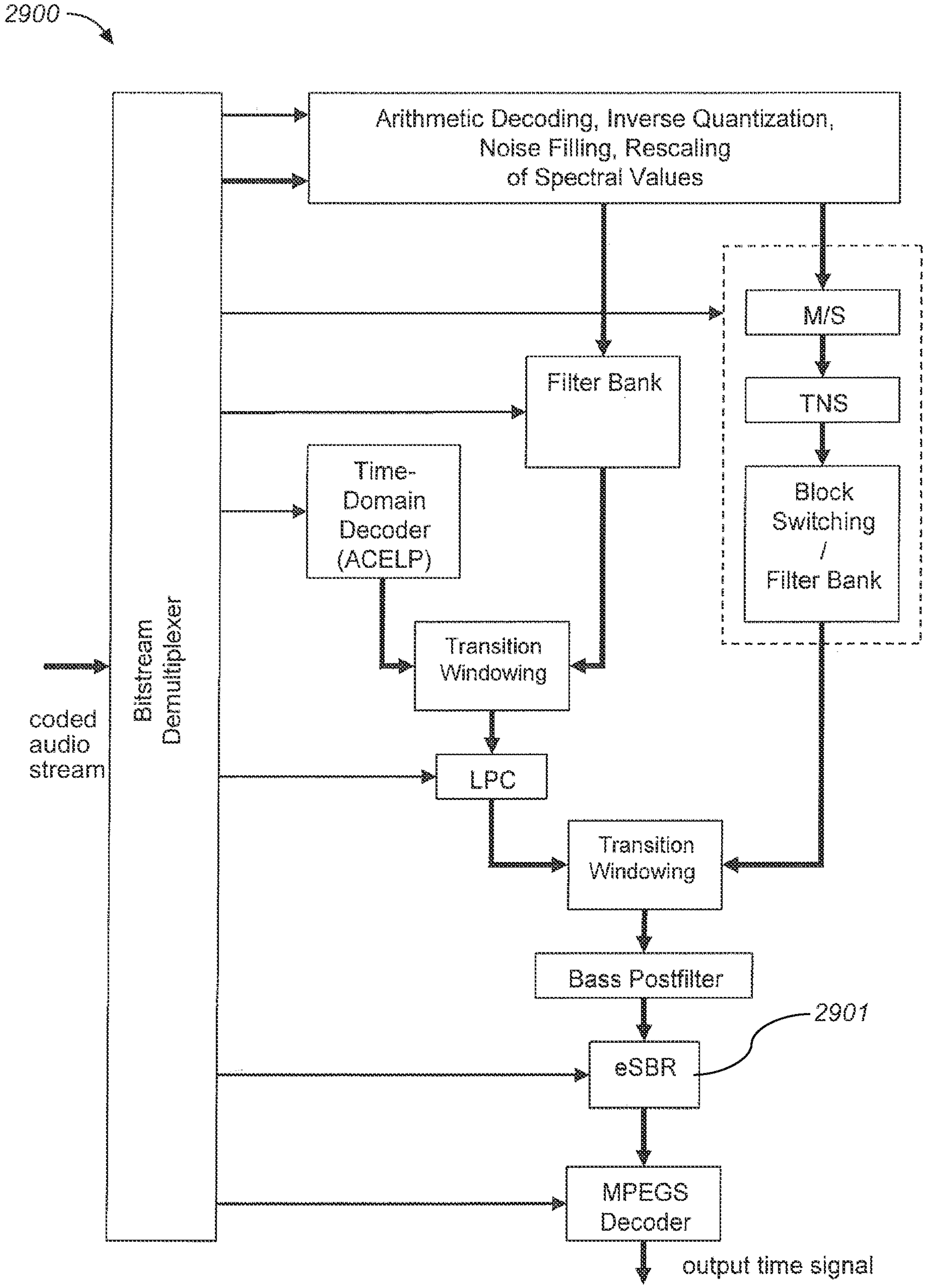

The decoder 2900 shown in FIG. 29 also comprises an enhanced Spectral Bandwidth Replication (eSBR) unit 2901. This eSBR unit 2901 receives the encoded audio bitstream or the encoded signal from the encoder 2800 and uses the methods outlined in the present document to generate a high frequency component of the signal, which is merged with the decoded low frequency component to yield a decoded signal. The eSBR unit 2901 may comprise the different components outlined in the present document. In particular, it may comprise an analysis filter bank 301, a non-linear processing unit 302 and a synthesis filter bank 303. The eSBR unit 2901 may use information on the high frequency component provided by the encoder 2800 in order to perform the high frequency reconstruction. Such information may be a fundamental frequency Ω of the signal, the spectral envelope of the original high frequency component and/or information on the analysis subbands which are to be used in order to generate the synthesis subband signals and ultimately the high frequency component of the decoded signal.

Figure 28:
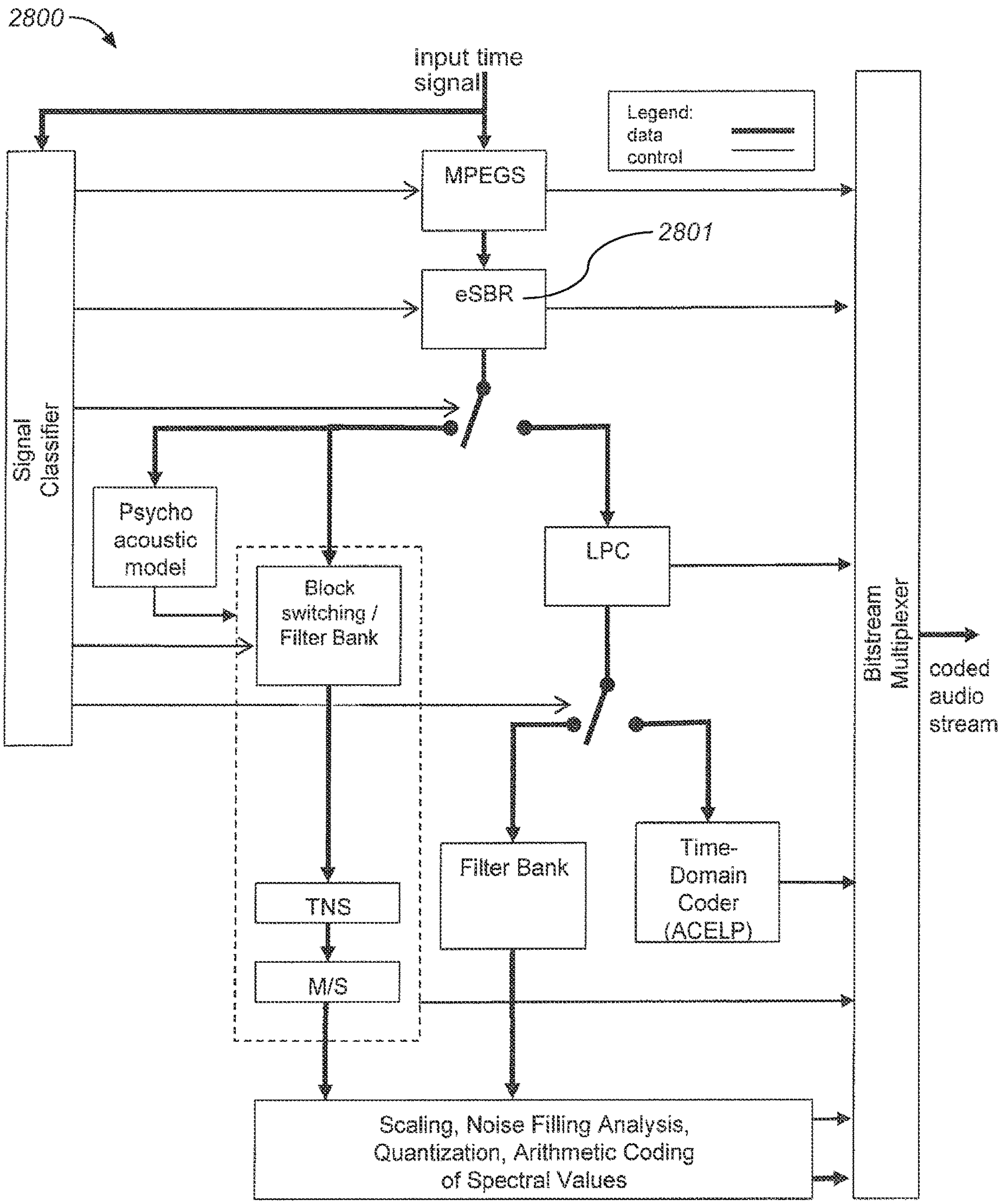
FIGS. 28 and 29 illustrate embodiments of an encoder and a decoder, respectively, using the enhanced harmonic transposition schemes outlined in the present document.

Furthermore, FIGS. 28 and 29 illustrate possible additional components of a USAC encoder/decoder, such as:

- a bitstream payload demultiplexer tool, which separates the bitstream payload into the parts for each tool, and provides each of the tools with the bitstream payload information related to that tool;
- a scalefactor noiseless decoding tool, which takes information from the bitstream payload demultiplexer, parses that information, and decodes the Huffman and DPCM coded scalefactors;
- a spectral noiseless decoding tool, which takes information from the bitstream payload demultiplexer, parses that information, decodes the arithmetically coded data, and reconstructs the quantized spectra;
- an inverse quantizer tool, which takes the quantized values for the spectra, and converts the integer values to the non-scaled, reconstructed spectra; this quantizer is preferably a companding quantizer, whose companding factor depends on the chosen core coding mode;
- a noise filling tool, which is used to fill spectral gaps in the decoded spectra, which occur when spectral values are quantized to zero e.g. due to a strong restriction on bit demand in the encoder;
- a rescaling tool, which converts the integer representation of the scalefactors to the actual values, and multiplies the un-scaled inversely quantized spectra by the relevant scalefactors;
- a M/S tool, as described in ISO/IEC 14496-3;
- a temporal noise shaping (TNS) tool, as described in ISO/IEC 14496-3;
- a filter bank/block switching tool, which applies the inverse of the frequency mapping that was carried out in the encoder; an inverse modified discrete cosine transform (IMDCT) is preferably used for the filter bank tool;
- a time-warped filter bank/block switching tool, which replaces the normal filter bank/block switching tool when the time warping mode is enabled; the filter bank preferably is the same (IMDCT) as for the normal filter bank, additionally the windowed time domain samples are mapped from the warped time domain to the linear time domain by time-varying resampling;
- an MPEG Surround (MPEGS) tool, which produces multiple signals from one or more input signals by applying a sophisticated upmix procedure to the input signal(s) controlled by appropriate spatial parameters; in the USAC context, MPEGS is preferably used for coding a multichannel signal, by transmitting parametric side information alongside a transmitted downmixed signal;
- a Signal Classifier tool, which analyses the original input signal and generates from it control information which triggers the selection of the different coding modes; the analysis of the input signal is typically implementation dependent and will try to choose the optimal core coding mode for a given input signal frame; the output of the signal classifier may optionally also be used to influence the behaviour of other tools, for example MPEG Surround, enhanced SBR, time-warped filterbank and others;
- a LPC filter tool, which produces a time domain signal from an excitation domain signal by filtering the reconstructed excitation signal through a linear prediction synthesis filter; and
- an ACELP tool, which provides a way to efficiently represent a time domain excitation signal by combining a long term predictor (adaptive codeword) with a pulse-like sequence (innovation codeword).

Figure 30:
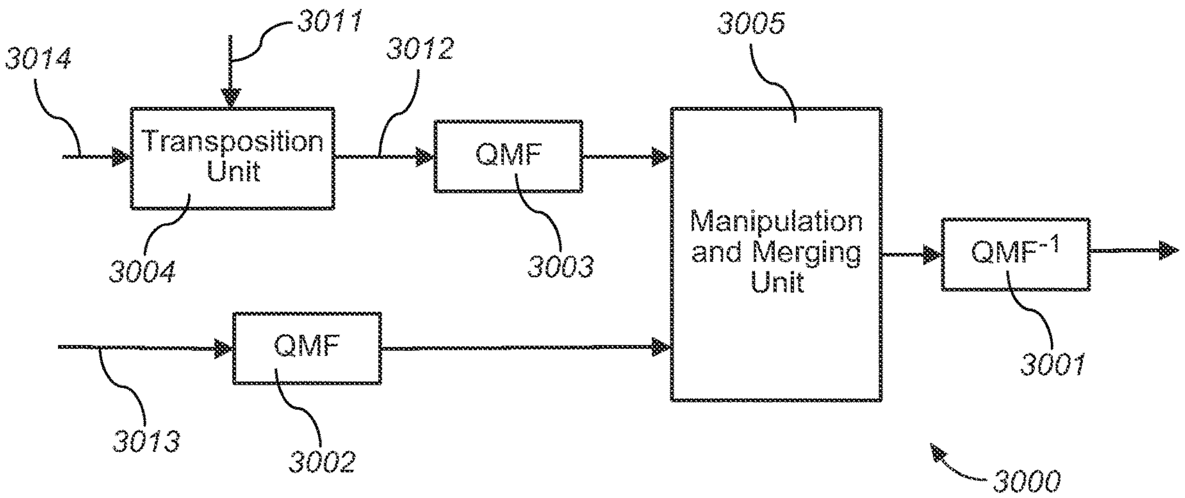
FIG. 30 illustrates an embodiment of a transposition unit shown in FIGS. 28 and 29.

FIG. 30 illustrates an embodiment of the eSBR units shown in FIGS. 28 and 29. The eSBR unit 3000 will be described in the following in the context of a decoder, where the input to the eSBR unit 3000 is the low frequency component, also known as the lowband, of a signal and possible additional information regarding specific signal characteristics, such as a fundamental frequency Ω, and/or possible index shift values $(p_1,p_2)$. On the encoder side, the input to the eSBR unit will typically be the complete signal, whereas the output will be additional information regarding the signal characteristics and/or index shift values.

In FIG. 30 the low frequency component 3013 is fed into a QMF filter bank, in order to generate QMF frequency bands. These QMF frequency bands are not be mistaken with the analysis subbands outlined in this document. The QMF frequency bands are used for the purpose of manipulating and merging the low and high frequency component of the signal in the frequency domain, rather than in the time domain. The low frequency component 3014 is fed into the transposition unit 3004 which corresponds to the systems for high frequency reconstruction outlined in the present document. The transposition unit 3004 may also receive additional information 3011, such as the fundamental frequency Ω of the encoded signal and/or possible index shift pairs $(p_1,p_2)$ for subband selection. The transposition unit 3004 generates a high frequency component 3012, also known as highband, of the signal, which is transformed into the frequency domain by a QMF filter bank 3003. Both, the QMF transformed low frequency component and the QMF transformed high frequency component are fed into a manipulation and merging unit 3005. This unit 3005 may perform an envelope adjustment of the high frequency component and combines the adjusted high frequency component and the low frequency component. The combined output signal is re-transformed into the time domain by an inverse QMF filter bank 3001.

Typically the QMF filter banks comprise 64 QMF frequency bands. It should be noted, however, that it may be beneficial to down-sample the low frequency component 3013, such that the QMF filter bank 3002 only requires 32 QMF frequency bands. In such cases, the low frequency component 3013 has a bandwidth of $f_s/4$, where $f_s$ is the sampling frequency of the signal. On the other hand, the high frequency component 3012 has a bandwidth of $f_s/2$.

The method and system described in the present document may be implemented as software, firmware and/or hardware. Certain components may e.g. be implemented as software running on a digital signal processor or microprocessor. Other component may e.g. be implemented as hardware and or as application specific integrated circuits. The signals encountered in the described methods and systems may be stored on media such as random access memory or optical storage media. They may be transferred via networks, such as radio networks, satellite networks, wireless networks or wireline networks, e.g. the internet. Typical devices making use of the method and system described in the present document are set-top boxes or other customer premises equipment which decode audio signals. On the encoding side, the method and system may be used in broadcasting stations, e.g. in video headend systems.

The present document outlined a method and a system for performing high frequency reconstruction of a signal based on the low frequency component of that signal. By using combinations of subbands from the low frequency component, the method and system allow the reconstruction of frequencies and frequency bands which may not be generated by transposition methods known from the art. Furthermore, the described HTR method and system allow the use of low cross over frequencies and/or the generation of large high frequency bands from narrow low frequency bands.

The invention claimed is:

1. A system for decoding an audio signal, the system comprising:

a core decoder for decoding a low frequency component of the audio signal;

an analysis filter bank for providing a plurality of analysis subband signals of the low frequency component of the audio signal;

a subband selection reception unit for receiving information associated with a fundamental frequency Ω of the audio signal, and for selecting, in response to the information, a first analysis subband signal and a second analysis subband signal from the plurality of analysis subband signals;

a non-linear processing unit to generate a synthesis subband signal from the first analysis subband signal and the second analysis subband signal, wherein a magnitude of the synthesis subband signal is based on a gain adjusted mean value of magnitudes of the first and second analysis subband signals, and a phase of the synthesis subband signal is based on a weighted sum of phases of the first and second analysis subband signals; and a synthesis filter bank for generating a high frequency component of the audio signal from the synthesis subband signal;

wherein the information associated with the fundamental frequency Ω of the audio signal is received in an encoded bit stream.

2. The system according to claim 1, wherein the analysis filter bank has N analysis subbands at an essentially constant subband spacing of $\Delta\omega$;

an analysis subband is associated with an analysis subband index n, with $n \in \{1, \ldots, N\}$;

the synthesis filter bank has a synthesis subband;

the synthesis subband is associated with a synthesis subband index n; and the synthesis subband and the analysis subband with index n each comprise frequency ranges which relate to each other through a factor T.

3. The system according to claim 2, further comprising:

an analysis window, which isolates a pre-defined time interval of the low frequency component around a pre-defined time instance k; and a synthesis window, which isolates a pre-defined time interval of the high frequency component around the pre-defined time instance k.

4. The system according to claim 3, wherein the synthesis window is a time-scaled version of the analysis window.

5. The system according to claim 1, further comprising:

an upsampler for performing an upsampling of the low frequency component to yield an upsampled low frequency component;

an envelope adjuster to shape the high frequency component; and a component summing unit to determine a decoded audio signal as the sum of the upsampled low frequency component and the adjusted high frequency component.

6. The system according to claim 5, further comprising an envelope reception unit for receiving information related to the envelope of the high frequency component of the audio signal.

7. The system according to claim 6, further comprising:

an input unit for receiving the audio signal, comprising the low frequency component; and an output unit for providing the decoded audio signal, comprising the low and the generated high frequency component.

8. The system according to claim 1, wherein the non-linear processing unit comprises a multiple-input-single-output unit of a first and second transposition order for generating the synthesis subband signal with a synthesis frequency from the first and the second analysis subband signals with a first and a second analysis frequency, respectively; wherein the synthesis frequency corresponds to the first analysis frequency multiplied by the first transposition order plus the second analysis frequency multiplied by the second transposition order.

9. The system according to claim 8, wherein the first analysis frequency is $\omega$;

the second analysis frequency is $(\omega+\Omega)$ the first transposition order is $(T-r)$;

the second transposition order is r;

$T>1$; and $1 \leq r < T$;

such that the synthesis frequency is $(T-r)\cdot\omega+r\cdot(\omega+\Omega)$.

10. The system according to claim 1, wherein the analysis filter bank exhibits a frequency spacing which is associated with the fundamental frequency Ω of the audio signal.

11. A method for decoding an audio signal, the method comprising:

decoding a low frequency component of the audio signal;

providing a plurality of analysis subband signals of the low frequency component of the audio signal;

receiving information associated with a fundamental frequency Ω of the audio signal;

selecting, in response to the information, a first analysis subband signal and a second analysis subband signal from the plurality of analysis subband signals;

generating a synthesis subband signal from the first analysis subband signal and the second analysis subband signal, wherein a magnitude of the synthesis subband signal is based on a gain adjusted mean value of magnitudes of the first and second analysis subband signals, and a phase of the synthesis subband signal is based on a weighted sum of phases of the first and second analysis subband signals; and generating a high frequency component of the audio signal from the synthesis subband signal;

wherein the information associated with the fundamental frequency Ω of the audio signal is received in an encoded bit stream.

12. A non-transitory storage medium comprising a software program adapted for execution on a processor and for performing the method step of claim 11 when carried out on a computing device.

* * * * *